US008458237B2

(12) United States Patent
Takashima et al.

(10) Patent No.: US 8,458,237 B2
(45) Date of Patent: Jun. 4, 2013

(54) BINDING UNIT MANIFEST FILE

(75) Inventors: Yoshikazu Takashima, Los Angeles, CA (US); Shinobu Hattori, Tokyo (JP); Saravana Prabhu Anbananthan, Los Angeles, CA (US)

(73) Assignees: Sony Corporation, Tokyo (JP); Sony Corporation of America, New York, NY (US); Sony Pictures Entertainment Inc., Culver City, CA (US)

( * ) Notice: Subject to any disclaimer, the term of this patent is extended or adjusted under 35 U.S.C. 154(b) by 284 days.

(21) Appl. No.: 12/415,710

(22) Filed: Mar. 31, 2009

(65) Prior Publication Data
US 2009/0271411 A1 Oct. 29, 2009

Related U.S. Application Data

(60) Provisional application No. 61/041,134, filed on Mar. 31, 2008.

(51) Int. Cl.
*G06F 17/30* (2006.01)

(52) U.S. Cl.
USPC ............. 707/822; 707/823; 707/831; 725/86; 369/30.01

(58) Field of Classification Search
USPC ................... 707/821–831; 725/86; 369/30.01
See application file for complete search history.

(56) References Cited

U.S. PATENT DOCUMENTS

| 7,424,497 B1* | 9/2008 | Leverett et al. ...................... 1/1 |
| 7,707,165 B1* | 4/2010 | Jiang et al. .................... 707/806 |
| 2005/0111831 A1* | 5/2005 | Matsumi et al. ................ 386/95 |
| 2005/0207732 A1 | 9/2005 | Cho et al. |
| 2006/0120223 A1* | 6/2006 | Seo et al. ................... 369/30.01 |
| 2006/0149910 A1* | 7/2006 | Kim et al. ..................... 711/162 |
| 2006/0153016 A1 | 7/2006 | Seo et al. |

(Continued)

FOREIGN PATENT DOCUMENTS

| JP | 2008-054048 A | 3/2008 |
| KR | 10-677597 | 2/2007 |
| WO | 2006100879 A1 | 9/2006 |

OTHER PUBLICATIONS

Wikipedia, "Virtual file system," Mar. 17, 2008, retrieved from the internet on Jul. 10, 2012 at http://en.wikipedia.org/w/index.php?title=Virtual_file_system&oldid=198856388 (XP55032297), 2 pages.

(Continued)

*Primary Examiner* — Hung T Vy
*Assistant Examiner* — Tina Huynh
(74) *Attorney, Agent, or Firm* — Procopio, Cory, Hargreaves & Savitch, LLC

(57) ABSTRACT

An information processing device including: a storage unit for storing a data file including readable content, and a control file including control information corresponding to the data file; and a data processing unit configured to use a filename conversion table, which stores filename conversion information, to convert the filename of a file stored in the storage unit into a virtual file system (VFS) name, to construct a VFS that includes storage data of a disc and storage data of the storage unit, and to perform a data reading process; wherein the data processing unit: compares the control information stored in the control file and data stored in the storage unit, and reads and/or updates the filename conversion table to reconcile the control information stored in the control file and the stored data in the storage unit.

16 Claims, 20 Drawing Sheets

U.S. PATENT DOCUMENTS

2006/0156354 A1* 7/2006 Jung et al. .................. 725/86
2007/0136282 A1* 6/2007 Takashima .................. 707/6
2007/0189718 A1* 8/2007 Kobayashi et al. ............ 386/95
2007/0220021 A1* 9/2007 Kato et al. .................. 707/100
2008/0082633 A1* 4/2008 Koyama et al. .............. 709/219
2009/0204572 A1  8/2009 Takashima et al.

OTHER PUBLICATIONS

Extended European Search Report issued for European Application No. 09755401.8, dated Jul. 19, 2012, 12 pages.

* cited by examiner

| INDEX (TITLES, etc., INDEX THAT CAN BE CATEGORIZED IN THE APPLICATION LAYER) | CONTENT CONTROL UNIT NUMBER (CPS UNIT NUMBER) | ENCODED CPS UNIT KEY |
|---|---|---|
| Title 1 | CPS1 | [Ku 1] |
| Title 2 | CPS1 | [Ku 1] |
| Application 1 | CPS2 | [Ku 2] |
| Application 2 | CPS3 | [Ku 3] |
| ⋮ | ⋮ | ⋮ |
| Data Group 1 | CPS4 | [Ku 4] |
| Data Group 2 | CPS5 | [Ku 5] |
| ⋮ | ⋮ | ⋮ |

FIG. 4

| FILENAME IN LOCAL STORAGE | STUDIO ID | PACKAGE ID | FILENAME AFTER CONVERSION |
|---|---|---|---|
| studioA.STREAM.00001.m2ts | 1 | 123 | BDMV/STREAM/00001.m2ts |
| studioA.CLIPINF.00001.clpi | 1 | 123 | BDMV/CLIPINF/00001.clpi |
| studioB.STREAM.01001.m2ts | 1,2,5 | (all) | BDMV/STREAM/01001.m2ts |
| studioB.CLIPINF.01001.clpi | 1,2,5 | (all) | BDMV/CLIPINF/01001.clpi |
| studioC.STREAM.00002.m2ts | 1 | 123 | BDMV/STREAM/00002.m2ts |
| studioC.STREAM.00002.m2ts | 2 | 456 | BDMV/STREAM/00012.m2ts |
| studioD.jimaku.dat | 1 | 123 | BDMV/STREAM/00099.m2ts |

FIG. 6

EXAMPLE OF DOWNLOAD FILE LOCAL CONTROL INFORMATION

| FILE TYPE | FILE ID | PATH OF FILE IN LOCAL STORAGE UNIT (LOCAL STORAGE) | FILE NAME IN VIRTUAL PACKAGE |
|---|---|---|---|
| ClipInfo File | 0x10001001 | Org_id/disc_id/AAAAAAAA/12345.clp | 01000.clpi |
| ClipAVStream File | 0x10001002 | Org_id/disc_id/AAAAAAAA/12345.mts | 01000.m2ts |
| PlayList File | 0x10001003 | Org_id/disc_id/AAAAAAAA/12345.mpl | 01000.mpls |

FIG. 8

EXAMPLE OF DOWNLOADED CONTENT LIST

| DOWNLOAD CONTENT ID | STORAGE DIRECTORY |
|---|---|
| 0xAAAAAAAA | Org_id /AAAAAAAA |
| 0xBBBBBBBB | Org_id/Disc_id/BBBBBBBB |
| : | : |
|  |  |

FIG. 10

INFORMATION PROCESSING DEVICE

| Download Content ID | Content Name | Content Explanatory Text | Genre | ... | Download Data Processing Information File ID | Demo Data File ID | Checksum (for checking the Download File) |
|---|---|---|---|---|---|---|---|
| 0xAAAAAAAA | Content A (HD) | (Omitted) | Special Feature | ... | 0x10001000 | 0x10001001<br>0x10001002<br>0x10001003<br>.. | 0xAAAAAAAA<br>0xBBBBBBBB<br>.. |
| 0xBBBBBBBB | Content B (SD) | (Omitted) | Previews | ... | 0x10002000 | 0x10002001<br>0x10002002<br>.. | 0xCCCCCCCC<br>0xDDDDDDDD<br>.. |
| .. | .. | .. | .. | .. | .. | .. | .. |

FIG. 12

EXAMPLE OF DOWNLOAD DATA PROCESSING INFORMATION FILE

| DOWNLOAD DATA FILE ID | FILE TYPE INFORMATION |
|---|---|
| File ID of Clip info File | Download Data File ID (for example: 0x1001001) is data indicating that this is Clip info |
| File ID of ClipAVStream File | Download Data File ID (for example: 0x1001002) is data indicating that this is a Clip AV Stream |
| File ID of Playlist File | Download Data File ID (for example: 0x1001003) is data indicating that this is a Playlist |

FIG. 14

(a) BUMF BEFORE UPDATING

| FILENAME IN LOCAL STORAGE | STUDIO ID | PACKAGE ID | POST CONVERSION FILENAME |
|---|---|---|---|
| studioA.STREAM.10001.m2ts | 1 | 123 | BDMV/STREAM/10001.m2ts |
| studioA.CLIPINF.10001.clpi | 1 | 123 | BDMV/CLIPINF/10001.clpi |
| studioA.PLAYLIST.10001.m2ts | 1 | 123 | BDMVPLAYLIST10001.mpls |

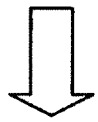

GENERATING/UPDATING BY INFORMATION PROCESSING DEVICE (b) BUMF AFTER UPDATING

| FILENAME IN LOCAL STORAGE | STUDIO ID | PACKAGE ID | POST CONVERSION FILENAME |
|---|---|---|---|
| studioA.STREAM.10001.m2ts | 1 | 123 | BDMV/STREAM/10001.m2ts |
| studioA.CLIPINF.10001.clpi | 1 | 123 | BDMV/CLIPINF/10001.clpi |
| studioA.PLAYLIST.10001.mpls | 1 | 123 | BDMVPLAYLIST10001.mpls |
| studioA.STREAM.10002.m2ts | 1 | 123 | BDMV/STREAM/10002.m2ts |
| studioA.CLIPINF.10002.clpi | 1 | 123 | BDMV/CLIPINF/10002.clpi |
| studioA.PLAYLIST.10002.mpls | 1 | 123 | BDMV/PLAYLIST/10002.mpls |

451 { (bracketing the last three rows)

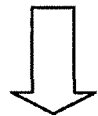

SEND TO SERVER

FIG. 16

BINDING UNIT MANIFEST FILE

CROSS-REFERENCE TO RELATED APPLICATIONS

This application claims the benefit of priority of U.S. Provisional Patent Application No. 61/041,134, filed Mar. 31, 2008, entitled "Binding Unit Manifest File." English-language translation of the above-referenced provisional application and a statement that the translation is accurate has been filed in the provisional application. The disclosures of the above-referenced provisional application and the translation of the provisional application are incorporated herein by reference.

BACKGROUND

1. Field of the Invention

The present invention relates to a virtual file system, and more specifically, to generating and updating a filename conversion table used in such a virtual file system.

2. Background

Audio data such as music, video data such as movies, game programs, various types of application programs, and the like, and various types of software data (hereinafter termed "content") can be stored on information recording media such as, for example, a Blu-ray Disc™ or a Digital Versatile Disc (DVD). The Blu-ray Disc™, which uses a blue laser, is a high-density recordable disc that is able to record high-resolution data such as large volume movie content.

For many types of content, such as music data or video data, typically the distribution rights, or the like, are owned by the creator or the vendor. Consequently, when this type of content is provided to the user, there is typically a specific limit to its use. That is, the content is put into a form wherein use of the content is allowed only for authorized users. Specifically, control (e.g., an encoding process) is performed to prevent unauthorized reproduction. For example, the Blu-ray Disc™ has a standard wherein the content stored on the disc is divided into content control units (CPS units), and control is performed by each unit by corresponding usage control information ("usage rules"). Usage of content belonging to a single CPS unit is allowed within the scope established by the usage control information (usage rule) associated with the CPS unit to which that content belongs.

The usage control information (usage rule) is recorded on the disc along with the content. When content is read, the reading device reads out the usage control information associated with the CPS unit to which the read content belongs, and the content is used in accordance with the usage control information. The usage control information (usage rule) includes, for example, copy control information (CCI) for the content, and has information such as whether or not the content may be copied, and modes wherein use is or is not allowed.

When the content belonging to the CPS unit is encrypted content, then an association is made with a CPS unit key, which is an encryption key corresponding to the unit. When reading the encrypted content, a decoding process is performed using the CPS unit key. Note that a CPS unit key file, where the CPS unit key is stored, is also recorded on the disc. Content that is stored on a Blu-ray Disc™ is used and controlled under this type of strict usage control. Moreover, the Blu-ray Disc™ standard also regulates the use and control of data, as subsequential data, when downloading, from the server, adjunct data corresponding to the content recorded on the disc, such as subtitles or alternate soundtrack data, or other service data or video or still image content, or the like corresponding to the content.

Systems for using content wherein subsequential data is obtained from a server, or the like, to be recorded in a local storage unit, such as a hard disk, to be read along with the content that is stored on the disc are disclosed in, for example, Patent Reference 1 (Japanese Patent 3959735), and Patent Reference 2 (Japanese Unexamined Patent Application Publication 2003-140662). The standard that is specified in the Blu-ray Disc™ has standards not only for the use and control of the content that is recorded on the disc, but also for the use and control of the subsequential data that is stored in the local storage unit, as described above. For example, this subsequential data is controlled according to the AACS (Advanced Access Content System). When reading out the subsequential data that is recorded in a local storage unit, such as a hard disk, together with content that is stored on a disc, for example, a Blu-ray Disc™, on a user device, the reading process is performed through the construction of a Virtual File System (VFS) that integrates the content that is stored on the disc with the content that is stored on the local storage unit, such as a hard disk. This reading process based on a VFS makes it possible to perform the reading process in the same way as a reading process from a single medium.

At the time of this VFS structuring process, a process is performed wherein the filename of the subsequential data that is stored in the local storage unit is changed to a filename for the VFS settings. A variety of subsequential data, from a variety of content provider servers, is stored in the local storage unit. When these subsequential data files are set up in the VFS, then it is necessary to set filenames for the VFS in order to ensure that there is no redundancy within the VFS, and in order to ensure reliable identification of the files.

SUMMARY

There is a need for a process to convert the filename within the local storage unit into a filename on the VFS. The user device maintains a filename conversion table for this filename conversion process. This filename conversion table is sometimes referred to as a manifest file or Binding Unit Manifest File (BUMF).

In the AACS (Advanced Access Content System) described above, file tampering validation data (e.g., Binding Unit Signature File (BUSF)), which is a signature setting file wherein a server private key for providing the subsequential data is applied to the data that structures the BUMF to enable the performance of strict usage control of the subsequential data.

The user device that uses the subsequential data first confirms the validity of the manifest file (BUMF) through signature validation of the file tampering validation data (BUSF). Conditional upon this confirmation, the manifest file (BUMF) is used to perform the filename conversion on the subsequential data that is stored in the local storage unit to construct the VFS. However, a variety of subsequential data from a variety of content providing servers is stored sequentially in the local storage unit of the user device, and it is necessary to update the manifest file (BUMF) and the file tampering validation data (BUSF) each time this type of subsequential data is acquired. A device that acquires subsequential data regularly must perform the updating process on these files frequently, and thus there is the need to increase the efficiency of the processes for generating and updating these files.

The present invention is the result of contemplation on, for example, the situation described above, and the object thereof is to provide an information processing device, an information processing system, an information recording medium, and an information processing method and program capable of performing efficiently updating of the manifest file (BUMF) and updating of the file tampering validation data (BUSF), etc., in a structure wherein subsequential data, such as data downloaded from a server, that corresponds to content stored in media such as a DVD or a Blu-ray Disc™, or the like, is stored in a local storage unit, such as a hard disk, for use.

A first aspect of the present invention is an information processing device comprising a storage unit for storing a data file containing readable content, and a control file containing control information corresponding to the data file; and a data processing unit for using a filename conversion table wherein is stored filename conversion information to convert the filename of a file stored in the storage unit into a VFS filename for a virtual file system (VFS), to construct a virtual file system (VFS) that includes storage data of a disc and storage data of the storage unit, to perform a data reading process; wherein the data processing unit performs processes for comparing storage data of the control file and storage data of the storage unit, and for generating or updating the filename conversion table so as to reconcile the storage data of the control file and the storage data of the storage unit.

Additionally, one form of embodiment of the information processing device as set forth in the present invention is structured so that when the data processing unit has performed the reading or updating process on the filename conversion table, the data processing unit performs the processes of sending the generated or updated filename conversion table to a server, receiving signature data of the server that is generated in relation to structural data of the filename conversion table, and storing in the storage unit.

Additionally, one form of embodiment of the information processing device as set forth in the present invention is structured so that the storage unit holds, as a control file, downloaded content table data, which is table data obtained from the server; and the data processing unit performs a comparison of the stored data of the downloaded content table data and the stored data of the storage unit, and performs a process of generating or updating the filename conversion table if a discrepancy is detected.

Additionally, one form of embodiment of the information processing device as set forth in the present invention is structured so that the downloaded content table data is data that stores directory information of the storage unit that stores data that is acquired from the server; and the data processing unit performs a comparison of a storage directory of the downloaded content table data and a setting directory of the storage unit, and performs a process of generating or updating the filename conversion table if a discrepancy is detected.

Additionally, one form of embodiment of the information processing device as set forth in the present invention is structured so that when the data processing unit has performed a generating or updating process on the filename conversion table, the data processing unit also performs a generating or updating process on the downloaded content table data.

Additionally, one form of embodiment of the information processing device as set forth in the present invention is structured so that the storage unit holds, as a control file, download file local control information that stores a storage filename of data stored in the storage unit; and the data processing unit performs a comparison of the storage file of the download file local control information and the storage file of the storage unit, and performs a process of generating or updating the filename conversion table if a discrepancy is detected.

Additionally, one form of embodiment of the information processing device as set forth in the present invention is structured so that when the data processing unit has performed a generating or updating process on the filename conversion table, the data processing unit also performs a generating or updating process on the download file local control information.

Additionally, one form of embodiment of the information processing device as set forth in the present invention is structured so that when the data processing unit obtains, from a server, data to be stored in the storage unit, the data processing unit receives, from the server, a download processing information file, and identifies the type of the obtained file and stores [the obtained file] in the storage unit in accordance with file type information that is stored in the received download processing information file.

Additionally, one form of embodiment of the information processing device as set forth in the present invention is structured so that when the data processing unit has performed an adding process or deleting process, or a use status changing process, regarding the stored data of the storage unit, the data processing unit performs a generating or updating process on the filename conversion table.

Additionally, one form of embodiment of the information processing device as set forth in the present invention is structured so that the data processing unit performs a generating or updating process on the filename conversion table through the execution of a program stored on the disc.

Additionally, a second aspect of the present invention is a server device comprising: a communication unit for receiving, from a user device, a filename conversion table wherein is stored filename conversion information for converting a filename of a file that is stored in a storage unit of a user device into a VFS filename for a virtual file system (VFS); a data processing unit for generating signature data that is applied as a server private key in regards to the data that structures the filename conversion table; and a communication unit for sending, to the user device, signature data generated by the data processing unit.

Additionally, a third aspect of the present invention is in a server device comprising: a communication unit for receiving, from a user device, predetermined content information of the user device; a data processing unit for generating, using the predetermined content information, a content list wherein is recorded content information that can be provided to the user device; and a communication unit for sending the content list to the user device.

Additionally, one form of embodiment of the server device as set forth in the present invention is structured so that the data processing unit generates identification information for a data file corresponding to the data that can be provided to the user device, and a content list corresponding to a download content ID.

Additionally, one form of embodiment of the server device as set forth in the present invention is structured so that the communication unit receives a data acquisition request from the user device; and the data processing unit, in response to the data acquisition request, generates a data file and a processing information file that stores file type information of the data file, and sends [these files] through the communication unit to the user device.

Additionally, one form of embodiment of the server device as set forth in the present invention is structured so that the data processing unit generates a content list wherein is set content that can be provided to the user device, depending on recording media on the user side.

Additionally, a fourth aspect of the present invention is an information recording medium for recording: a data file containing readable content; and a program for performing a generating process or an updating process for a filename conversion table wherein is stored filename conversion information for converting, into a VFS filename of a virtual file system (VFS), a filename of a file that is stored in a storage unit of a reading device; wherein the reading device for reading the information recording medium can generate or update a filename conversion table in accordance with the program.

Additionally, one form of embodiment of the information recording medium as set forth in the present invention is structured so that the program includes a program for executing a comparing process of control data and a file that is stored in a storage unit of a reading device.

Additionally, one form of embodiment of the information recording medium as set forth in the present invention is structured so that the program includes a program for acquiring, from a server, signature data for the filename conversion table.

Additionally, a fifth aspect of the present invention is in an information processing system comprising a server for performing a data providing process and an information processing device for performing the reception of data from the server, structured so that: the information processing device comprises: a storage unit for storing a data file containing readable content, and a control file containing control information corresponding to the data file; and a data processing unit for using a filename conversion table wherein is stored filename conversion information to convert the filename of a file stored in the storage unit into a VFS filename for a virtual file system (VFS), to construct a virtual file system (VFS) that includes storage data of a disc and storage data of the storage unit, to perform a data reading process; wherein the data processing unit performs processes for detecting discrepancies between storage data of the control file and storage data of the storage unit, and for generating or updating the filename conversion table so as to reconcile the storage data of the control file and the storage data of the storage unit; and wherein the server generates, and sends to the information processing device, signature data wherein a server private key is applied to the data that structures the filename conversion table received from the information processing device.

Additionally, a sixth aspect of the present invention is in a data processing method that is executed in an information processing device, comprising: a step wherein a data processing unit performs a comparing process for a data file stored in a storage unit and storage data of a control file; and a step wherein, when a discrepancy between the storage data of the control file and the storage data of the storage unit is detected, the data processing unit performs a generating or updating process for the filename conversion table that is applied for converting a filename of a file that is stored in the storage unit to a VFS filename for a virtual file system (VFS).

Additionally, a seventh aspect of the present invention is in a program that causes the execution of information processing in an information processing device, comprising: a step that causes a data processing unit to perform a comparing process for a data file stored in a storage unit and storage data of a control file; and a step that, when a discrepancy between the storage data of the control file and the storage data of the storage unit is detected, causes data processing to perform a generating or updating process for the filename conversion table that is applied for converting a filename of a file that is stored in the storage unit to a VFS filename for a virtual file system (VFS).

Note that the program as set forth in the present invention is a computer program that can be provided to a general-use computer system that can execute, for example, various program codes, provided via a recording medium that is provided in a computer-readable format or via a communications medium. Processing can be achieved on the computer system in accordance with the program by providing this type of program in a computer-readable format.

The structure of one example of embodiment as set forth in the present invention is applied to a structure that stores subsequential data, corresponding to content that is stored in an information recording medium, such as a DVD, into a local storage unit, such as a hard disk, or the like, for use. When constructing a virtual file system (VFS) to be used in a content reading process that includes data that is stored on a disc and data that is stored in a storage unit, it is necessary to use a filename conversion table to convert the storage unit storage filename to a VFS filename for the virtual file system (VFS). In a structure in one example of embodiment as set forth in the present invention, a process is performed to compare, for data that is stored in a local storage unit, the stored information of a control file that stores control information, compared to the stored data of the local storage unit, and a process is performed to generate or update the filename conversion table, on the user device side, in accordance with the results of the comparison. This structure achieves an efficient process without having to rely on the server side for the generation of the filename conversion table.

Yet other objects, features, and benefits of the present invention will be understood through the detailed explanation of the present invention, below, based on examples of embodiment of the present invention and on the appended drawings. Note that in the present specification, "the system" is a logical collective structure of a plurality of devices, and is not limited to each structural device being within the same frame.

BRIEF DESCRIPTION OF THE DRAWINGS

FIG. 4 is a diagram for explaining an example of a specific structure for a CPS unit key file.

FIG. 6 is a diagram for explaining an example of a filename conversion table that is stored in subsequential data searching information.

FIG. 8 is a diagram for explaining an example of a data structure for download file local control information that is stored in a local storage unit of an information processing system according to one example of embodiment as set forth in the present invention.

FIG. 10 is a diagram for explaining an example of a data structure for a downloaded content list that is stored in a local storage unit of an information processing system according to one example of embodiment as set forth in the present invention.

FIG. 12 is a diagram for explaining an example of a data structure for a content list that is provided to a server.

FIG. 14 is a diagram for explaining an example of a data structure for a download data processing information file that is provided to a server.

FIG. 16 is a diagram for explaining an example of a process for generating a filename conversion table (manifest file (BUMF) that includes the information for the newly obtained subsequential data.

DETAILED DESCRIPTION

Certain embodiments as disclosed herein provide for generating and updating (on a user device) a filename conversion table used in a virtual file system (VFS). In one embodiment, the VFS is constructed to read data stored in a storage unit local to the user device.

After reading this description it will become apparent how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention.

The information processing device, information processing system, information recording medium, and information processing method and program as set forth in the present invention will be described below in reference to the figures. The explanations will be made in accordance with the following items:

1. Overview of Structure and Processes in the Information Processing Device.

2. Overview of the Content Reading Process Using VFS, and of the Filename Conversion Table (BUMF).

3. Example of a Process for Generating and Updating the Filename Conversion Table (BUMF) and Control Data.

1. Overview of Structure and Processes in the Information Processing Device

An explanation will be given first regarding an overview of the structure and processes in an information processing device in accordance with one embodiment of the present invention.

Figure 1:
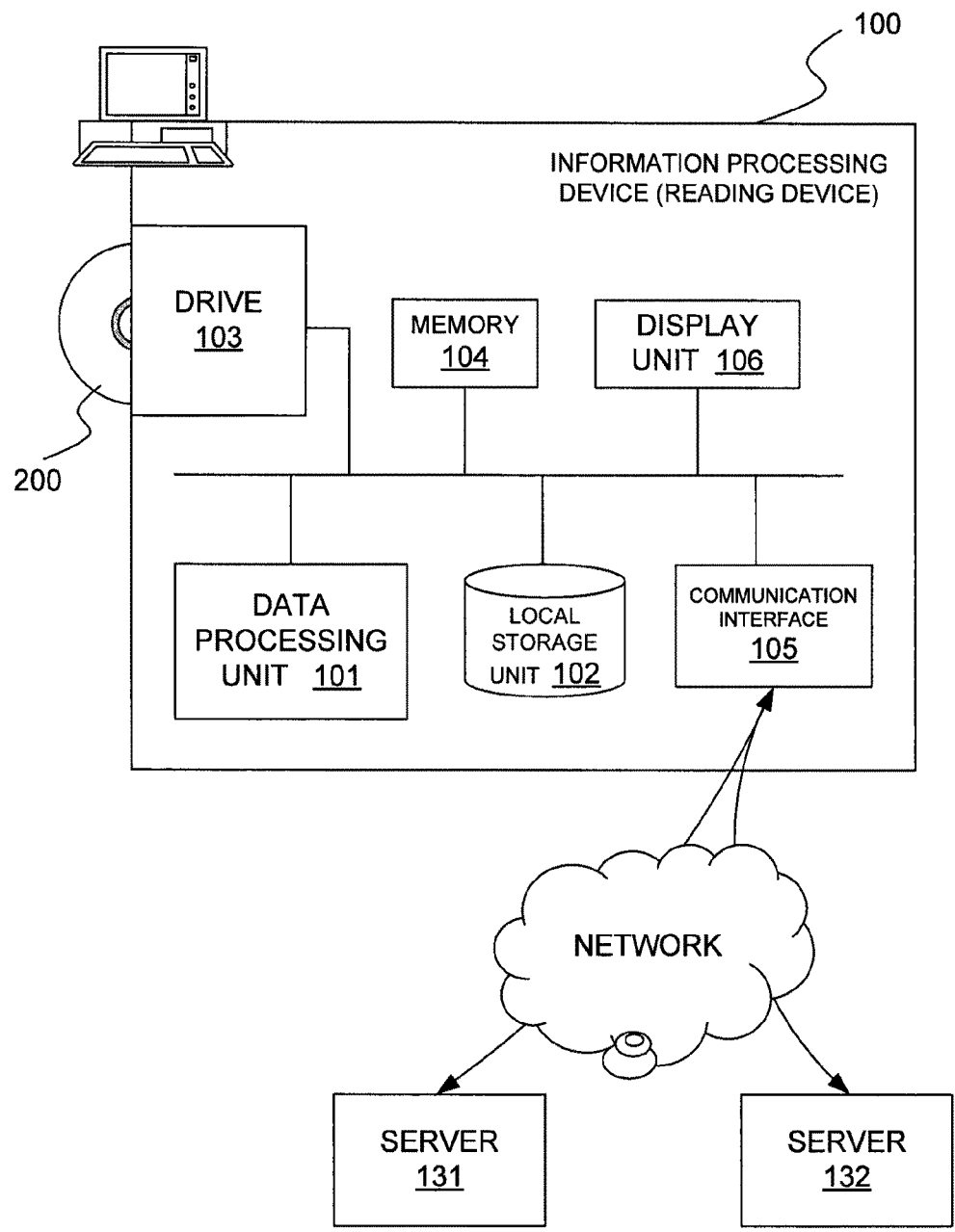
FIG. 1 is a diagram for explaining a structure of an information processing system according to one example of embodiment as set forth in the present invention.

FIG. 1 is a block diagram illustrating an information processing device 100 (e.g., a PC or reading device) that performs the process of reading an information recording medium (disc) (e.g., a DVD or Blu-ray Disc™). The information processing device 100 includes a data processing unit 101, a local storage unit 102, a drive 103, a memory 104, a communication interface 105, and a display unit 106.

The data processing unit 101 includes a program executing function to execute content reading processes and subsequential data control processes. The local storage unit 102 is configured to store control and subsequential data. In one embodiment, the subsequential data includes data generated by the user and data downloaded from servers 131 and 132. The subsequential data corresponds to content that is stored on an information recording medium 200. The drive 103 is configured to perform data input and output relative to the information recording medium 200. A memory 104 includes various types of memory storage including a read-only memory (ROM) and/or random-access memory (RAM) used in a program executing area and a parameter storing area. The communication interface 105 is configured to facilitate communication through a network. The display unit 106 is configured to display content and content information.

The local storage unit 102 is structured, for example, from a hard disk or a flash memory, or the like. Note, for example, that when the information recording medium 200 is structured as having a recordable data area (such as an R-type medium, an RE-type medium, a partial ROM, or the like), the structure may have a portion of the information recording medium 200 used as a local storage unit.

The information processing device 100 reads the content stored on the information recording medium 200 through the drive 103 to perform a content reading process. This process is performed under the control of a data processing unit 101. The information recording medium 200 may be, for example, ROM media wherein the content is prerecorded, or datawritable R-type or RE-type medium wherein content is obtained and recorded by the user through a process such as downloading from a server.

The information processing device 100 acquires (through the servers 131, 132) and records (to the local storage unit 102) auxiliary data when reading out the content that is stored on the information recording medium 200. In one example, the auxiliary data is subtitle data or alternate soundtrack data if the content is movie content. In another example, the auxiliary data is service data corresponding to the content. In a further example, the auxiliary data is score information, history information, and/or other subsequential data that is obtained through executing the game if the content is a game program.

The data that is stored in the local storage unit 102 is, for example, data that is acquired or generated corresponding to any of the content that is stored in the information recording medium 200, and at the time of a process of reading out the content that is stored in the information recording medium 200, the subsequential data that is stored in the local storage unit 102 and selected by the user can be read in conjunction. In this reading process, a VFS (Virtual File System) is constructed that combines the content that is stored on, for example, a disc, with content that is stored in the local storage unit, such as a hard disk, and the reading process is performed. This reading process based on a VFS makes it possible to perform the reading process in the same way as a reading process from a single medium. The reading process based on VFS will be described in detail in a later stage.

When recording subsequential data, the data processing unit 101 generates or updates control information or explanatory information regarding the subsequential data, as necessary, and stores this information in the local storage unit 102. The data processing unit 101 records the subsequential data and control information and/or explanatory information into a subsequential data directory that is established in the local storage unit 102.

The data processing unit 101 controls the subsequential data by a control unit known as a binding unit (BU). The control unit (BU) is established as a unit that includes subsequential data, such as content downloaded from a server or user-generated data, that is generated or acquired subsequently corresponding to content that is stored in the information recording medium 200. The majority of the subsequential data is data that can be read and used in conjunction with reading of the content that is stored in the information recording medium 200.

When reading subsequential data that is stored in the local storage unit 102 in conjunction with the content that is stored in the information recording medium (disc) 200, the data processing unit 101 constructs the VFS (virtual file system) and then performs the reading process, as described above, and at this time, the data processing unit 101 performs a filename conversion process for the subsequential data that is stored in the local storage unit 102. The table that is applied to this conversion process is known as a filename conversion table (manifest file (BUMF)). The manifest file stores subsequential data control information by the control unit (binding unit (BU)) unit, and is also known as a "binding unit manifest file (BUMF)."

While, fundamentally, a single manifest file (BUMF) is established for a single control unit (BU), the control information for a plurality of control units may also be stored in a single manifest file (BUMF). Specific examples of manifest files (BUMFs), and examples of use thereof, will be explained in a later stage.

Figure 2:
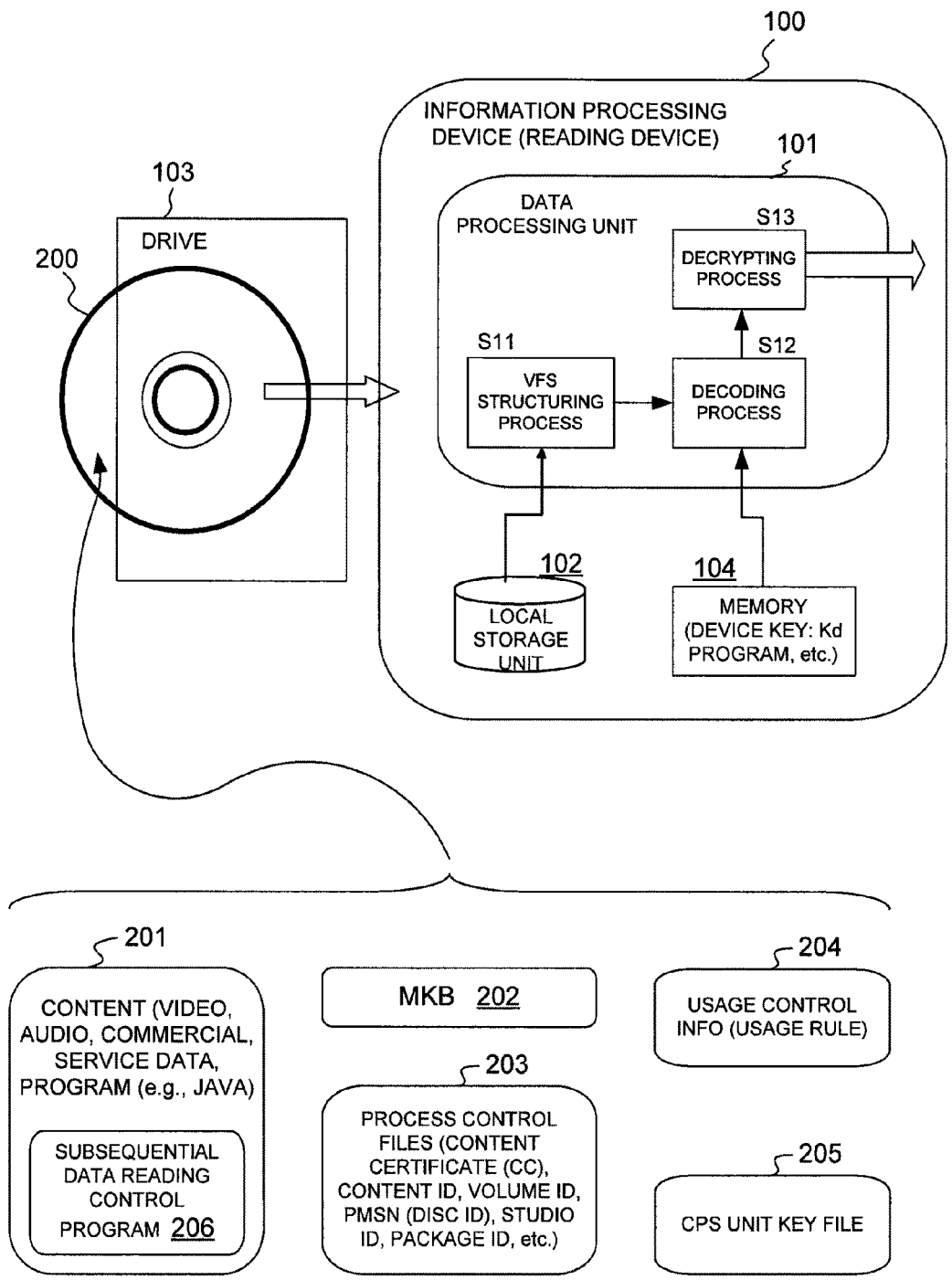
FIG. 2 is a diagram illustrating data stored in an information recording medium and a content reading process in an information processing device (reading device) 100.

An example of data that is stored in the information recording medium and an example of a content reading process in the information processing device will be explained next in reference to FIG. 2 and FIG. 3. FIG. 2 is a diagram illustrating data stored in the information recording medium 200 and a content reading process in the information processing device (reading device) 100. An example is shown here wherein information has been stored on a ROM disc, as the disc wherein content has been stored. The information processing device 100 may be of a variety of information processing devices, such as a PC or a dedicated player device, and possesses a drive 103 for executing the process of reading data from the information recording medium 200.

The ROM disc, as the information recording medium (disc) 200 may be, for example, an information recording medium such as a Blu-ray Disc™ or a DVD, and is an information recording medium wherein is stored legal content, manufactured in, for example, a disc manufacturing factory under the authority of the owner of the legal rights to the content.

As is shown in FIG. 2, the information recording medium (disc) 200 is recorded with: content 201; an MKB (Media Key Block) 202, as an encryption key block that is generated based on a hierarchical key distribution method that is well-known as one type of broadcast encryption method; a process control file 203 that includes a content certificate (CC) for proving the legality of the content, etc., that is stored in the information recording medium 200, a content ID as a content identifier, a volume ID that is established as an identifier for each individual information recording medium or for each group of a predetermined number of information recording media, a PMSN (Prerecorded Media Serial Number) that corresponds to a media ID as identification information that is unique to the disc, and so forth; usage control information (usage rules) 204 that include, for example, CCI (Copy Control Information) as content copy/read control information; and a CPS unit key file wherein is stored a CPS unit key that is an encryption key that is established for each individual content control unit (CPS unit) as the unit for content usage control; wherein these data are all stored thereon.

Note that in the present example, a subsequential data reading control program 206 is included, in the content 201, as program information that is applied to the process of downloading content from a server, described below. The subsequential data reading control program is a program that is structured from, for example, a Javs [sic—"Java"?]™ application, and is also known as a BD-J application. An overview of the information that is stored on the information recording medium 200 will be explained below.

(1) The Content 201

A variety of content is stored on the information recording medium (disc) 200. For example, content such as an AV (AudioVisual) stream of movie content, such as HD (High-Definition) movie content, or a game program, an image file, audio data, text data, a Java™ application program, or the like.

Of these contents, the main content, such as movie content, is data stored in a specific AV format, and is recorded as data that is encrypted following the AACS (Advanced Access Content System) standard, which is a standard for a content copyright protection technology. That is, the content is divided into units (CPS units) and recorded onto the disc as encrypted content to which unit keys (CPS unit keys) corresponding to each unit are applied. Details regarding the recording format for the content will be explained in a later stage in reference to FIG. 3.

This content 201 further includes Java™ application programs, game programs, graphics files, audio data, text data, and so forth stored as subcontent. In some cases, the subcontent is data that does not follow the AV data format.

Both the main content and the subcontent include, as types of content, a variety of content such as audio data, movies, graphic data such as still images, game programs, Web content, and the like, where these contents include a variety of types of information including content information that can be used exclusively by data from the information recording medium 200, content information wherein data from the information recording medium 200 can be used in conjunction with data that is provided from a server that is connected to a network, and so forth.

(2) The Media Key Block (MKB)

The MKB 202 is an encryption key block that is generated based on a hierarchical key distribution method that is well-known as one type of broadcast encryption method. The MKB 202 is a key information block that enables the acquisition of the media key (Km) that is required for decrypting the content through a process (decryption) that is based only on a device key (Kd) that is stored in a user information processing device that has a valid license. This is an application of an information distribution method that follows a hierarchical tree-structure, which enables the acquisition of the media key (Km) only when the user device (the information processing device) has a valid license, where the media key (Km) cannot be acquired in a user device that has been invalidated (through a revocation process).

The control center that performs the control of the MKB is able to generate, through changing the device key that is used in encrypting the key information, an MKB that has a structure wherein decoding is not possible using the device key that is stored in a particular user device, or in other words, wherein the media key that is required for content decryption cannot be acquired. Consequently, an illegal device can be excluded (revoked) at any given time, enabling the provision of decryptable encrypted content to only those devices that have valid licenses.

(3) The Process Control File

The process control file 203 includes, for example, the following data: a content certificate (CC) that is a certificate for proving the legality of the content that is stored on the disc; a content ID as an identifier for the content that is stored on the information recording medium 200; a volume ID that is established as an identifier for each individual information recording medium or for each group of a predetermined number of information recording media; and a PMSN (Prerecorded Media Serial Number) that corresponds to a media ID as identification information that is unique to the disc.

In addition to these, a disc ID is included as identification information for the information recording medium 200, a studio ID is included as an identifier of the studio that edited the content stored in the information recording medium 200, and a package ID is included as a package identifier, as the unit by which the information recording medium 200 is manufactured. Note that the package ID is sometimes termed a "disc ID."

(4) The Usage Control Information (Usage Rules)

The usage control information (usage rules) 204 includes, for example, copy/read control information (CCI). That is, this is information for controlling copying or information for controlling reading for usage control, corresponding to the encrypted content 201 that is stored on the information recording medium 200, the content that is acquired subsequentially from a server, or the like. This copy/read control information (CCI) can be provided in a variety of ways, such as being provided as information for individual CPS units that are established as content control units, or being provided corresponding to a plurality of CPS units.

(5) The CPS Unit Key File

The encrypted content that is stored in the information recording medium 200 is, as described above, divided into CPS units that are established as content control units, and encrypted using the encryption keys for the individual units. The information processing device that performs the reading process must identify the CPS unit that belongs to the content to be read, and must perform the decryption process using the CPS unit key as the decryption key that corresponds to the identified CPS unit. The file that stores the data that is required in order to obtain this CPS unit key is the CPS unit key file. Note that when reading content, it is necessary to apply not just the CPS unit key, but also a variety of other key information, key generating information, and the like.

FIG. 2 illustrates the detail of the data that is stored on the information recording medium 200, and illustrates schematically the process in the information processing device 100 for reading the content that is stored on the information recording medium 200 in conjunction with the content that is stored in the local storage unit 102, such as content that is acquired from a server subsequentially. This information processing device has a drive 103 for performing a process for reading the data that is stored on the information recording medium.

First, in Step S11, the data processing unit 101 of the information processing device 100 performs the process of structuring a VFS (virtual file system). That is, a VFS (virtual file system) is structured combining the content that is stored on the information recording medium (disc) 200 and the content that is stored in the local storage unit 102, such as a hard disk, or the like. This reading process based on a VFS makes it possible to perform the reading process in the same way as a reading process from a single medium. Thereafter, in Step S12 through S13, the content is read through performing a content decryption process and performing a decoding process (such as MPEG decoding).

The memory 104 is a memory that is structured from ROM [and/or] RAM used in a program executing area and a parameter storing area, and the like, and stores the device key (Kd) that is applied to the content decrypting process, the program that performs the various processes, and so forth. When decrypting the content, the information processing device 100 generates a key to be applied to the decryption of the content based on data stored in this memory 104 and data read from the information recording medium 200, and performs a decryption process on the encrypted content to be read.

An example of the format of the content that is stored on the information recording medium will be explained next in reference to FIG. 3. At least a portion of the content that is stored on the information recording medium is stored after an encryption process is performed after the assignment of keys that are different for each individual unit, in order to achieve usage control that is different for each unit. That is, the content is divided into content control units (CPS units) and encryption processes are performed on each, to perform usage control for each.

When using content, such as reading encrypted content, it is necessary to obtain the CPS unit keys that are assigned to each unit first, after which the reading is performed through applying the other necessary keys and key generating information, and performing data processing based on a predetermined decryption processing sequence. Forms wherein the content control unit (CPS unit) are provided will be explained in reference to FIG. 3.

Figure 3:
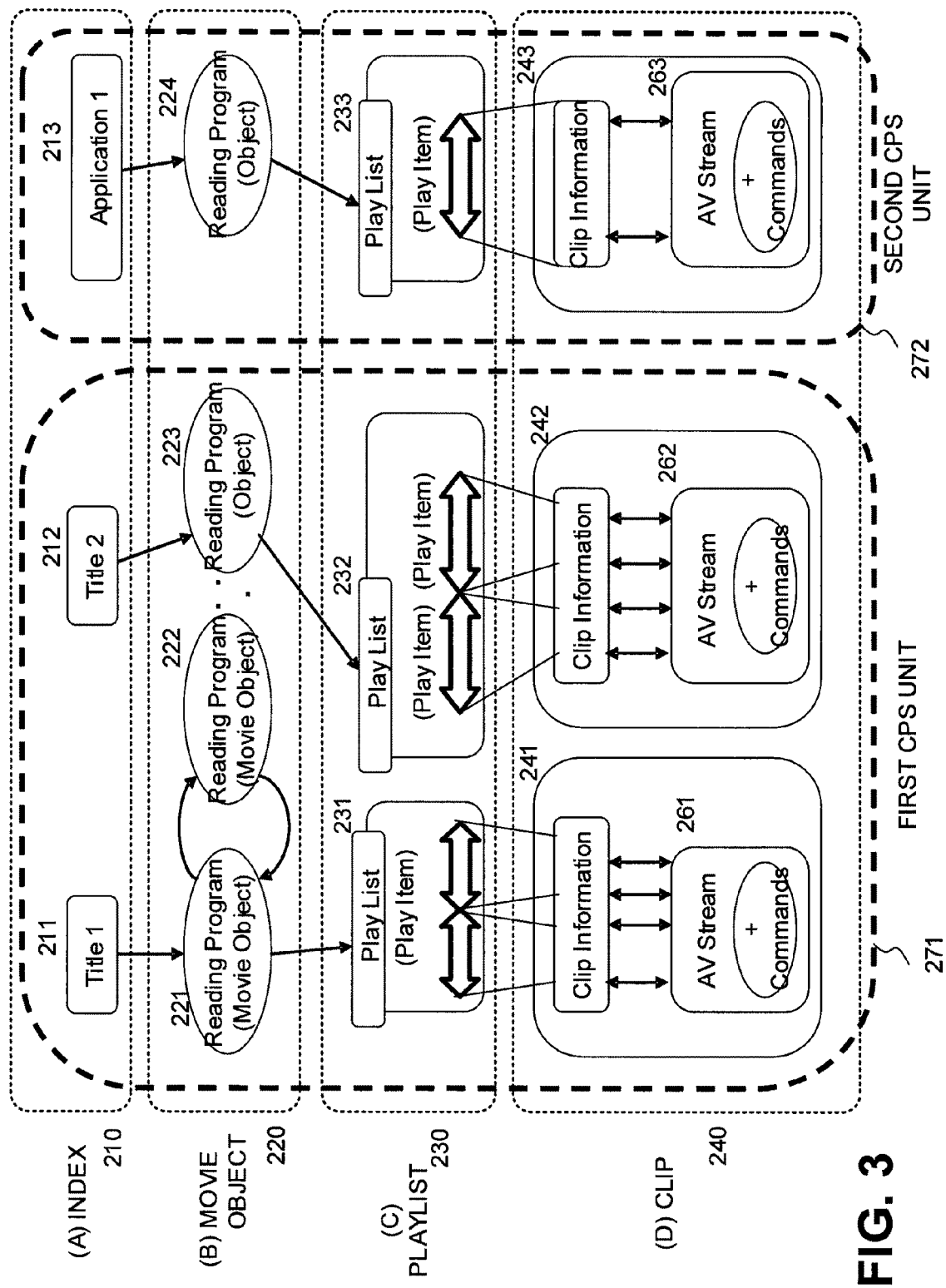
FIG. 3 is a diagram for explaining an example of a format for content that is stored on an information recording medium.

As a shown in FIG. 3, the content has a hierarchical structure of (A) an index 210, (B) a movie object 220, (C) a play list 230, and (D) a clip 240. When an index is specified, such as a title to be accessed by a reading application, the reading program that is associated with the title, for example, is specified, and, in accordance with the program information for the specified reading program, a play list is selected that specifies the sequence of reading the content.

The play list includes play items that are information specifying the data to be read. Depending on the clip information, as the segments to be read, specified by the play items that are included in the play list, the AV stream and commands, and the like, are read selectively as the actual content data, and processes are performed to read the AV stream and execute the commands. Note that there are pluralities of play lists and play items, and each is associated with a play list ID and play item ID, respectively, as identification information.

Note that the format illustrated in FIG. 3 is a format for content encrypted in accordance with the AACS standard, and not all of the content 201 that is stored on the disc is necessarily data in accordance with this format. Commercial content, service content, Java™ program content, and other content may also be stored on the disc in addition to the encrypted data that is stored in accordance with this format. These contents may also be recorded on the disc as non-encrypted content, and play lists may be used in reading this type of content as well.

That is, while the provision of the play list illustrated in FIG. 3 illustrates an example of a play list that specifies reading of only AV streams that are all encrypted data, it is also possible to provide, in addition thereto, play lists for using AV streams following the AACS standard, and for reading content as non-encrypted data. Note that when reading content, the content is read after the user specifies the title; however, one or more content to be read can be selected and read sequentially by a selected play list by a reading program being selected through the specification of the title by the user, and the play list being selected by that reading program.

FIG. 3 illustrates two CPS units in encrypted content that is included in the content 201 that is recorded on the disc 200. These constitute a portion of the content that is stored on the information recording medium. The first CPS unit 271 and the second CPS unit 272 are each a CPS unit that is established as a unit that includes a title as the index, a movie object as the reading program file, a play list, and a clip that includes an AV stream file as the data of the actual content.

The first content control unit (CPS unit) 271 includes a first title 211, a second title 212, the reading programs 221 and 222, the play lists 231 and 232, the clip 241, and the clip 242, where the AV stream data files 261 and 262 that are the data of the actual contents that are included in the two clips 241 and 242 are data that is subjected to, at least, encryption, where, in principle, this is data that is encrypted through the use of the CPS unit key (Ku1) that is the encryption key that is established associated with the first content control unit (CPS unit) 271.

The second content control unit (CPS unit) 217 includes, as the index, a first application 213, the reading program 224, the play list 233, and the clip 243, where the AV stream data file 263 that is the data of the actual content that is included in the clip 243 is encrypted through the use of the CPS unit key (Ku2) that is an encryption key that is the encryption key that is established associated with the second content control unit (CPS unit) 272.

For example, in order for the user to execute the application file or the content reading process corresponding to the first content control unit 271, it is necessary to execute the decryption process after acquiring the unit key Ku1 as the encryption key that is established in association with the first content control unit (CPS unit) 271. In order to execute the application file or the content reading process corresponding to the second content control unit 272, it is necessary to execute the decryption process after acquiring the unit key Ku2 as the encryption key that is established in association with the second content control unit (CPS unit) 272.

An example of a specific structure for a CPS unit key file is illustrated in FIG. 4. FIG. 4 is a diagram that illustrates the structure of the CPS unit key file as a table. As a shown in FIG. 4, the CPS unit key file is partitioned for each index information, such as a title, and has a data structure wherein a decrypted CPS unit key (Kun) is associated with a content control unit number (CPS unit number) that is associated with each index.

The information processing device that performs the reading of the content performs the decryption process for the CPS unit, which is the encrypted content, after acquiring the corresponding CPS unit key based on the unit number (the CPS unit number) that is established in the individual CPS unit.

2. Overview of the Content Reading Process Using VFS, and of the Filename Conversion Table (BUMF)

As described above, when reading subsequential data that is stored in the local storage unit 102 in conjunction with the content that is stored in the information recording medium (disc) 200, the data processing unit 101 of the information processing device 100 that performs the reading process constructs the VFS (virtual file system) and then performs the reading process. At this time, a filename conversion process is performed for the subsequential data that is stored in the local storage unit 102. The table that is applied to this conversion process is the filename conversion table (manifest file (BUMF)). An overview of the content reading process using VFS, and of the filename conversion table (BUMF) will be explained below.

Figure 5:
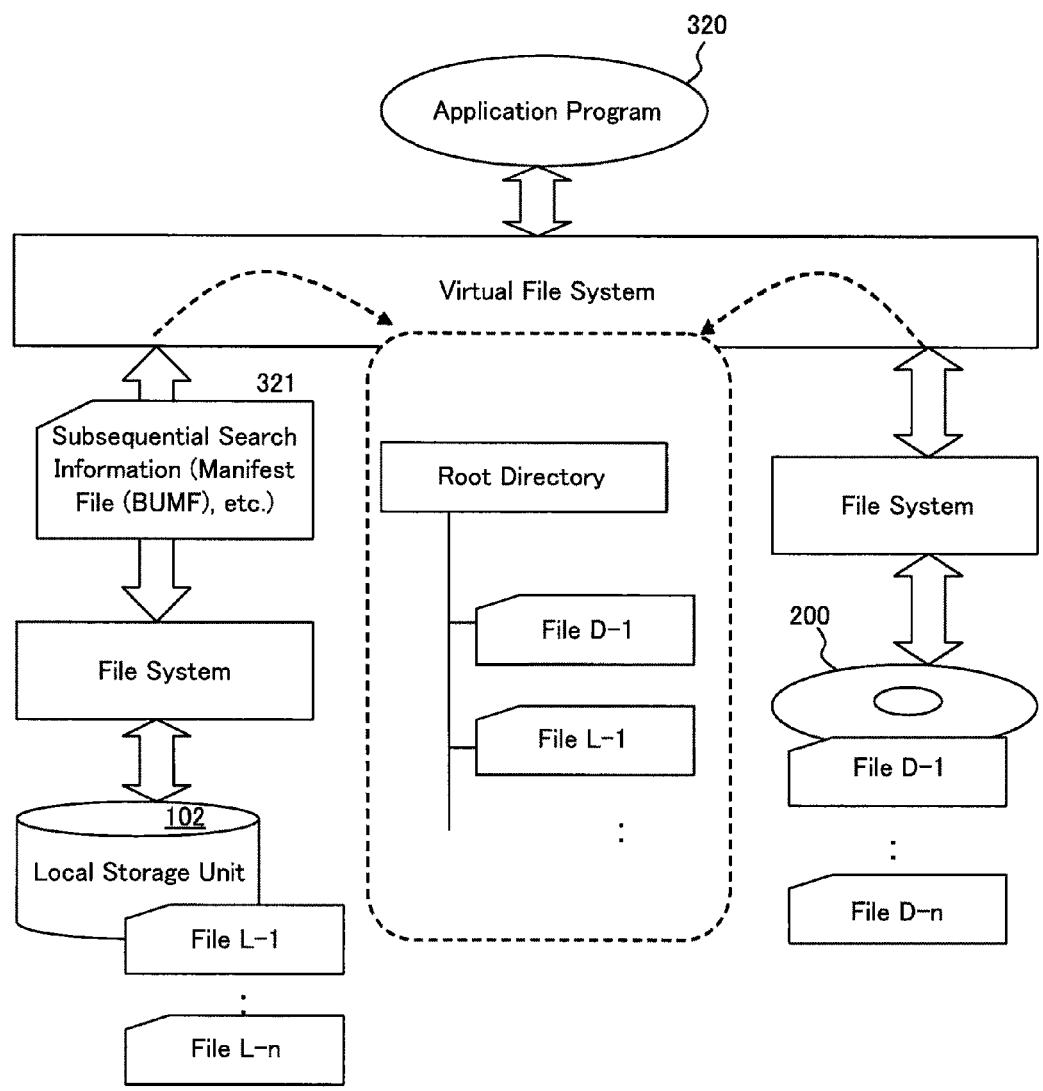
FIG. 5 is a diagram for explaining a virtual file system that is generated in an information processing device.

The VFS (virtual file system) that is established when subsequential data that is stored in the local storage unit 102, such as a hard disk, is read in conjunction with the content that is stored on the information recording medium (disc) 200 will be described in reference to FIG. 5. If, for example, the content that is stored in the information recording medium (disc) 200 is movie content in French, and the subsequential data that is stored in the local storage unit 102, such as a hard disk, is Japanese-language subtitle data corresponding to the movie content, it is possible to play the movie with Japanese-language subtitling by reading both together.

When reading this type of compound content, the information processing device 100 combines, virtually, the directory and file that include the subsequential data control file of the local storage unit 102 and the directories and files of the information recording medium (disc) 200. That is, a VFS (virtual file system) is established. The process for setting up this VFS (virtual file system) establishes, in a single virtual directory, the data files on the disc and the corresponding subsequential data files in the local storage unit. This process enables high-speed access to files that are stored on different recording media. (0084) The application program 320 illustrated in FIG. 5 is an application program for performing, in the information processing device 100, the process of reading, etc., movie objects, subsequential data read control programs (BD-J applications), and the like. The application program 320 handles, via the virtual file system, files that are stored on the information recording medium (disc) 200 and files that are stored in the local storage unit 102. The application program 320 obtains, via the virtual file system, the required subsequential data files through the use of subsequential data searching information 321, which is search information for files that are recorded in the local storage unit 102.

The virtual file system plays the role of concealing, from the application program 320, the differences between the recording media (the file systems). Consequently, the application program 320 can use the same APIs, etc., to handle the files that are stored on both of the recording media through, without being aware of the differences in the recording media on which the files are stored.

For example, when the disc is loaded into the device, or when an application program is launched, the virtual file system is generated by merging the file system on the disc with the file system on the local storage unit 102, and the virtual file system (VFS) that is generated is stored in the memory of the information processing device 100. In this case, the VFS (Virtual File System) is updated each time there is a change in a directory or file that is stored in the local storage unit 102 by, for example, writing a file.

In this way, it is necessary to establish the VFS (Virtual File System) when the subsequential data that is stored in the local storage unit 102 is read in conjunction with the content that is stored in the information recording medium (disc) 200.

At the time of the process for establishing this VFS (Virtual File System), it is necessary to perform a filename conversion process for the subsequential data that is stored in the local storage unit 102. The table that is applied to this filename conversion process is the filename conversion table (manifest file (BUMF)). The structure of the filename conversion table (BUMF) will be explained in reference to FIG. 6.

When a filename conversion table (BUMF) is stored in the local storage unit 102 together with a subsequential data file obtained from a server, and a process is performed for generating the VFS that is the virtual file system, the information processing device 100 references the filename conversion table to convert the filename in the local storage unit to the filename in the VFS, and puts it into the VFS.

The filename conversion table (BUMF) illustrated in FIG. 6 has a structure wherein associations are established between each entry for the filename in the local storage unit, the studio ID, the package ID, and the filename after conversion. That is, the filename conversion table (BUMF) contains information for converting the filename of a file that is stored in the local storage unit into a VFS filename for the virtual file system (VFS).

The filename in the local storage unit is the actual filename when recording into the local storage unit 102 that stores the subsequential data. To prevent redundancy, the studio name, for example, is added to establish the filename.

The filename conversion process is determined dependent on, for example, the package ID and the studio ID corresponding to the read content. When the reading process is performed, a binding process is performed on the subsequential data and the data on the information recording medium (disc) 200. All of the studio IDs and package IDs have associations established in regards to the subsequential data to be used, and the information processing device that performs the content reading process obtains the studio ID and package ID of the content to be read, and based on these IDs, obtains the post-conversion filename through the application of the filename conversion table, and establishes, as the filename in the virtual file system, this filename that has been obtained.

For example, if the filename on the local storage unit 102 is "studioA.STREAM.00001.m2ts," and the studio ID of the content to be read is 1, and the package ID of the content to be read is 1, 2, and 3, then the post-conversion filename will be "BDMV/STREAM/00001.m2ts." This post-conversion filename of "BDMV/STREAM/00001.m2ts" is the filename that can be used by the reading application.

Performing the conversion of the filename through the application of the filename conversion table (BUMF) in this way makes it possible to set the filename freely in the directory in the local storage unit 102, making it possible to create filenames freely without redundancy.

Note that although the second and third entries in the filename conversion table (BUMF) illustrated in FIG. 6 both have "studioC.STREAM.00002.m2ts" as the filenames in the local storage unit, when the studio ID=1 and the package ID=1, 2, or 3, then the post-conversion filename will be "BDMV/STREAM/00002.m2ts," but if the studio ID=2 and the package ID=4, 5, or 6, then the post-conversion filename will be "BDMV/STREAM/00012.m2ts," and thus the structure is one wherein the conversion will be to different filenames depending on the values of the studio ID and the package ID. Performing the filename conversion process through the application of the filename conversion table in this way enables, for example, the establishment of different files to be applied in different reading applications.

Note that file tampering validation data (BUSF: Binding Unit Signature File) is stored in the local storage unit 102 of the user information processing device 100 to enable rigorous usage control of the subsequential data. The file tampering validation data (BUSF) is a file that provides a signature to which a private key of a control server (for example, a subsequential data providing server) is applied to the data that structures the BUMF.

The user device that uses the subsequential data first confirms the validity of the manifest file (BUMF) through signature validation of the file tampering validation data (BUSF). Conditional upon this confirmation, the manifest file (BUMF) is used to perform the filename conversion on the subsequential data that is stored in the local storage unit to construct the VFS.

3. Example of a Process for Generating and Updating the Filename Conversion Table (BUMF) and Control Data An example of a process for generating and updating the filename conversion table (BUMF) and control data will be explained next. A variety of subsequential data, from a variety of content provider servers, is stored sequentially in the local storage unit 102 of the user information processing device 100.

Processes are required to generate or update the manifest file (BUMF) and control data, and to generate or update the file tampering validation data (BUSF), each time this type of subsequential data is obtained. That is, the data processing unit 101 of the information processing device 100 shown in FIG. 1 performs a comparison process of the data stored in the local storage unit 102 with the storage data of the control file stored in the local storage unit 102, and performs a process of generating or updating the filename conversion table and the manifest file (BUMF) so as to reconcile between the information recorded in the control file and the data stored in the local storage unit 102.

A device that acquires subsequential data regularly must perform the process of creating or updating these files frequently, and thus there is the need to increase the efficiency of these processes. An example of a process for creating and updating the manifest file (BUMF), the control data, and the file tampering validation data (BUSF) as set forth in an example of embodiment according to the present invention will be described below.

Figure 7:
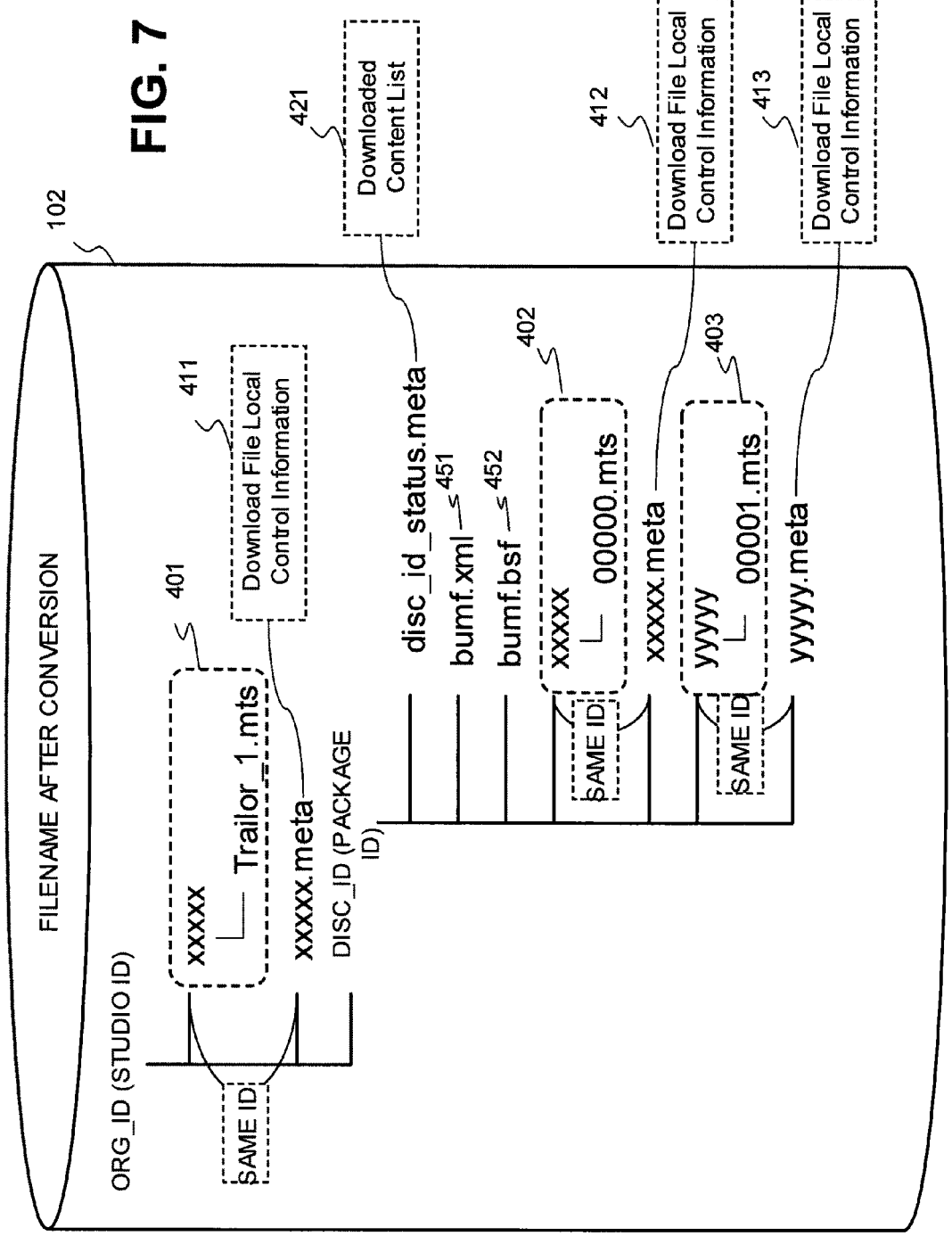
FIG. 7 is a diagram for explaining an example of a structure of data that is stored in a local storage unit of an information processing system according to one example of embodiment as set forth in the present invention.

First an example of a directory when subsequential data is written to the local storage unit 102 of the information processing device 100 on the user side will be explained in reference to FIG. 7. The example of the directory in the local storage unit 102 that is illustrated in FIG. 7 is an example of a directory that is partitioned by the studio (Org: Organization) unit that provided the subsequential data, and is further partitioned by the disc (=package) unit (Disc_id) provided by the studio.

The subsequential data 401, 402, and 403 provided in the directory illustrated in FIG. 7 correspond to subsequential data received by a content providing server corresponding to the studio (Org) of this directory. As described above, the subsequential data 401 through 403 comprise, for example, subtitle data, or the like, when the content stored on the disc is a movie content. In most cases, the subsequential data also has a data structure in accordance with the data format explained already in reference to FIG. 3; that is, in most cases the subsequential data comprises an index, a movie object, a play list, a clip, and the like.

Download file local control information 411 through 413 are provided corresponding to the individual subsequential data 401 through 403. An example of these download file local control information 411 through 413 is illustrated in FIG. 8. The download file local control information records the storage filenames of the data that is downloaded from a server and stored in the local storage unit.

The download file local control information, as shown in FIG. 8, comprises a file type that is the type of file that comprises the subsequential data, a file ID, a pathname for the file in the local storage unit, and a filename in the virtual package, and data corresponding thereto.

Note that the "virtual package" is synonymous with the VFS (virtual file system) described above, and the last filename in the data that structures the post-conversion filename of the manifest file (BUMF) that is the filename conversion table that was described above in reference to FIG. 6 is the filename in the virtual package.

The data that structures the post-conversion filename of the manifest file (BUMF) that is the filename conversion table that was explained in reference to FIG. 6 is structured as described below. For example, the filename in the top row of the post-conversion filenames of the manifest file (BUMF) illustrated in FIG. 6 is set as the filename below, where the "BDMV" and the "STREAM" of the "BDMV/STREAM/00001.m2ts" are defined by the directory structure established in the virtual file system (VFS), and the "00001.m2ts" is the filename that is established below the "BDMV" and the "STREAM." This filename corresponds to the filename in the virtual package in the download file local control information illustrated in FIG. 8.

An example of changes in the data that is stored in the local storage unit, and of the transitions in the file settings for the subsequential data in the virtual file system (VFS) that is established through the application of the manifest file (BUMF), which is the filename conversion table, when subsequential data is added into the local storage unit 102, will be explained in reference to FIG. 9.

Figure 9:
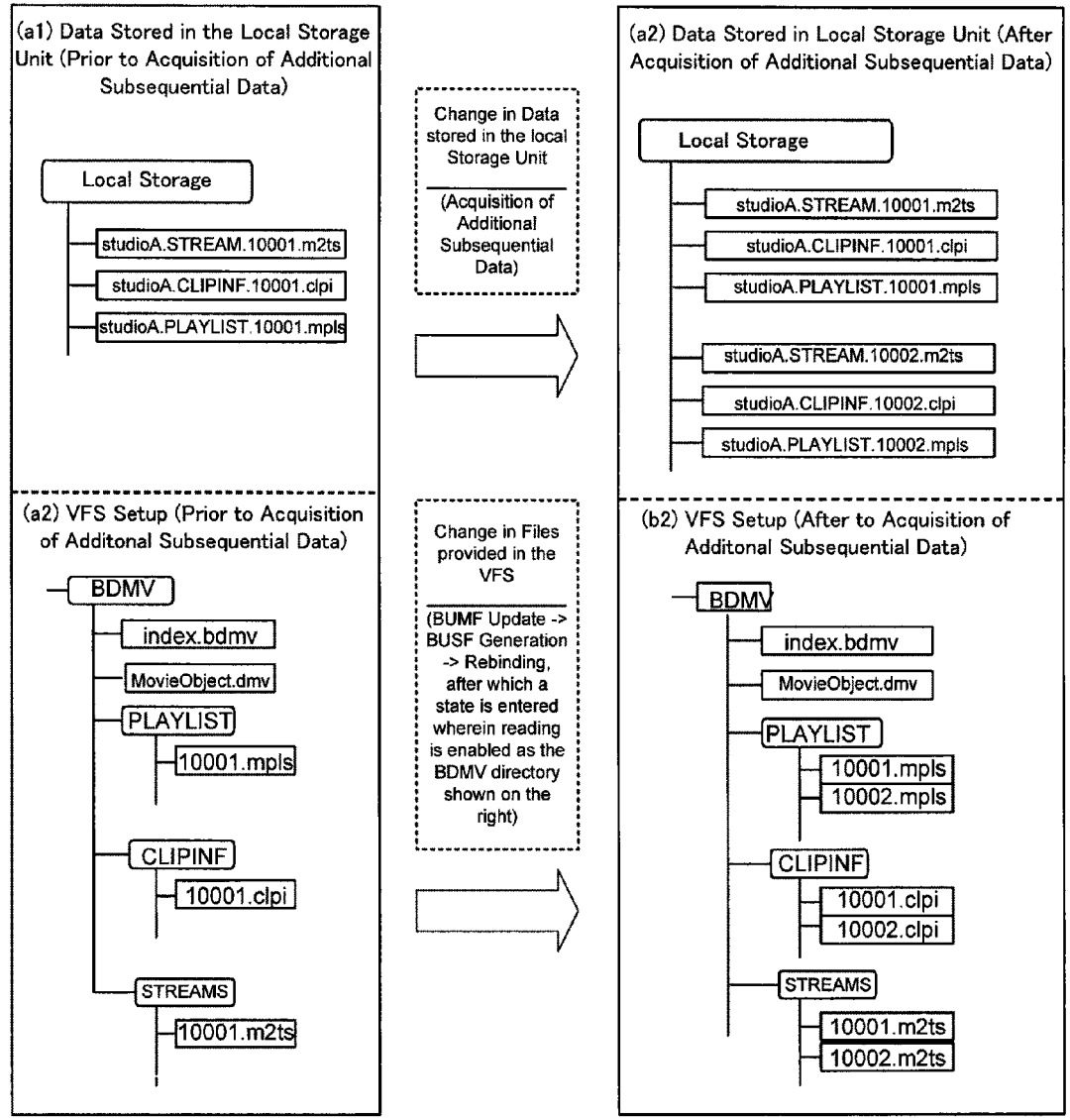
FIG. 9 is a diagram for explaining files that are set in a virtual file system (VFS) and the data that is stored in a local storage unit of an information processing system according to one example of embodiment as set forth in the present invention.

FIG. 9 illustrates examples of file settings for: (a1) Data stored in the storage unit (before acquiring additional subsequential data); (a2) VFS (virtual file system) settings (before acquiring additional subsequential data); (b1) Data stored in the storage unit (after acquiring additional subsequential data); (b2) VFS (virtual file system) settings (after acquiring additional subsequential data).

The data stored initially in the local storage unit in the state of (a1) data stored in the storage unit (before acquiring additional subsequential data) transitions to the state of (b1) data stored in the storage unit (after acquiring additional subsequential data).

The additional data that is acquired comprises the three files shown in (b1) data stored in the storage unit (after acquiring additional subsequential data):

An AV stream file: "studioA.STREAM.10002.m2ts"
A clip information file: "studioA.CLIPINF.10002.clpi"
A play list file: "studioA.PLAYLIST.10002.mpls"

When these additional files are stored in the local storage unit, the studio name, etc., are applied as shown in FIG. 9 (b1) to make it possible to establish these files in the local storage unit without redundancy.

When reading, the filename conversion table (manifest file (BUMF)) illustrated in, for example, FIG. 6, is used to change the filename, as described above, to establish the filename that is set in the VFS. The result is that the directory set up on the local storage unit side wherein the VFS is structured will be the directories of (a2) and (b2) shown in FIG. 9.

As a shown in FIG. 9 (a2) and (b2), in the VFS (virtual file system) all of the files are established in the BDMV directory specified in the Blu-ray Disc™. Subdirectories in the format that has already been explained in reference to FIG. 3, that is subdirectories for (A) indexes, (B) movie objects, (C) play lists, (D) clips, and (E) streams, are set up under the BDMV directory and the respective data files are set up in the respective subdirectories.

Note that although only the data on the local storage unit side is illustrated in FIG. 9, the respective files from the content that is stored on the information recording medium (disc) 200 side, which are produced in conjunction, are also stored in these same directories. The reading process is performed through the application program 320, which performs the reading process, obtaining the files for the local storage unit and the files for the information recording medium (disc) 200 side in the VFS, shown in FIG. 9 (a2) and (b2) through the use of the VFS that was explained already in reference to FIG. 5.

In this way, in the process of structuring the VFS, processes, such as setting up the files of the local storage unit, are performed in accordance with the BDMV directory that is specified in the Blu-ray Disc™. The use of the virtual file system that is established through structuring this VFS enables the application program 320 illustrated in FIG. 5 to use the same APIs, etc., to handle the files that are stored on both of the recording media through, without being aware of the differences in the recording media on which the files are stored.

Note that the download file local control information illustrated in FIG. 8 comprises files that are controlled by the download unit (by the download ID) of the local storage unit, and are generated by the information processing device on the user side and stored in the local storage unit 102.

The "disc_ID_status.meta" file shown in the directories illustrated in FIG. 7 is a downloaded content list information file, having, for example, the structure illustrated in FIG. 10. As is shown in FIG. 10, this file has a data structure that defines the relationship between the download content ID and the storage directory.

The "bumf.xml" file shown in the directories illustrated in FIG. 7 is a filename conversion table (a manifest file (BUMF)), and the file "bumf.bsf" is file tampering validation data (BUSF). As described above, the file tampering validation data (BUSF) is a file that includes signature data depending on the private key of a server (the content server that provides the subsequential data) for the data that structures the filename conversion table (the manifest file (BUMF)).

The processing sequence by which the user information processing device 100 obtains the subsequential data from the content server that provides the subsequential data will be described next in reference to FIG. 11. First, in Step S101, the information processing device on the user side generates or obtains list information (a filename list) for the content in the user information processing device 100, doing so through a search of the information recording medium (disc) 200 and the local storage unit 102.

The server that provides the subsequential data determines the subsequential data to be provided to the user depending on the content that is possessed on the user side. Consequently, on the user side information processing device, information for the content that is possessed on the local device is generated using, for example, the downloaded content table explained above in reference to FIG. 10. This information is sent to the server in Step S102, and a list of the subsequential data (i.e., a list of content) that can be provided in response to the content that is possessed is requested.

The server references the information regarding the content that is possessed, received from the user information processing device, generates a list of content corresponding to the content that can be provided to the user, and then, in Step S103, sends this list to the user-side information processing device. An example of a content list that is sent from the server is illustrated in FIG. 12.

As a shown in FIG. 12, the content list is structured from the download content ID, the content name, the content explanatory text, the genre, . . . , the download data processing information file ID, the download data file ID, the checksum (for checking the download file), and the data corresponding to these data. The download data processing information file is a file that lists, for example, the file types of the subsequential data, and the details thereof will be described below.

In this way, owned content information is received by the server from the user information processing device through the communication unit, and the owned content information that has been received is used in the data processing unit of the server to generate the content list illustrated in FIG. 12, which records information on content that can be provided to the user device, and this list is provided to the user device through the communication unit. Note that the content list that is generated by the server, as shown in FIG. 12, is a list of content wherein identification information for data files that correspond to the data that can be provided to the user device is associated with download content IDs, a list wherein the information is established in response to the recording media on the user side.

Note that a special directory corresponding to the downloaded content ID of the content illustrated in FIG. 12 is established when the user-side information processing device 100 has actually downloaded the subsequential data. The information processing device 100 stores the subsequential data that has been downloaded, etc., in this directory that has been established. Note that, in this data recording process, there is no need for the filename to be identical to the downloaded content ID. As has already been explained in reference to FIG. 9 (a1) and (b1), the storage can use a filename set up using the studio name, or the like. The correspondence between the download content ID and the actual storage directory in the local storage unit 102 is recorded in the downloaded content list data that has already been explained in reference to FIG. 10.

Figure 11:
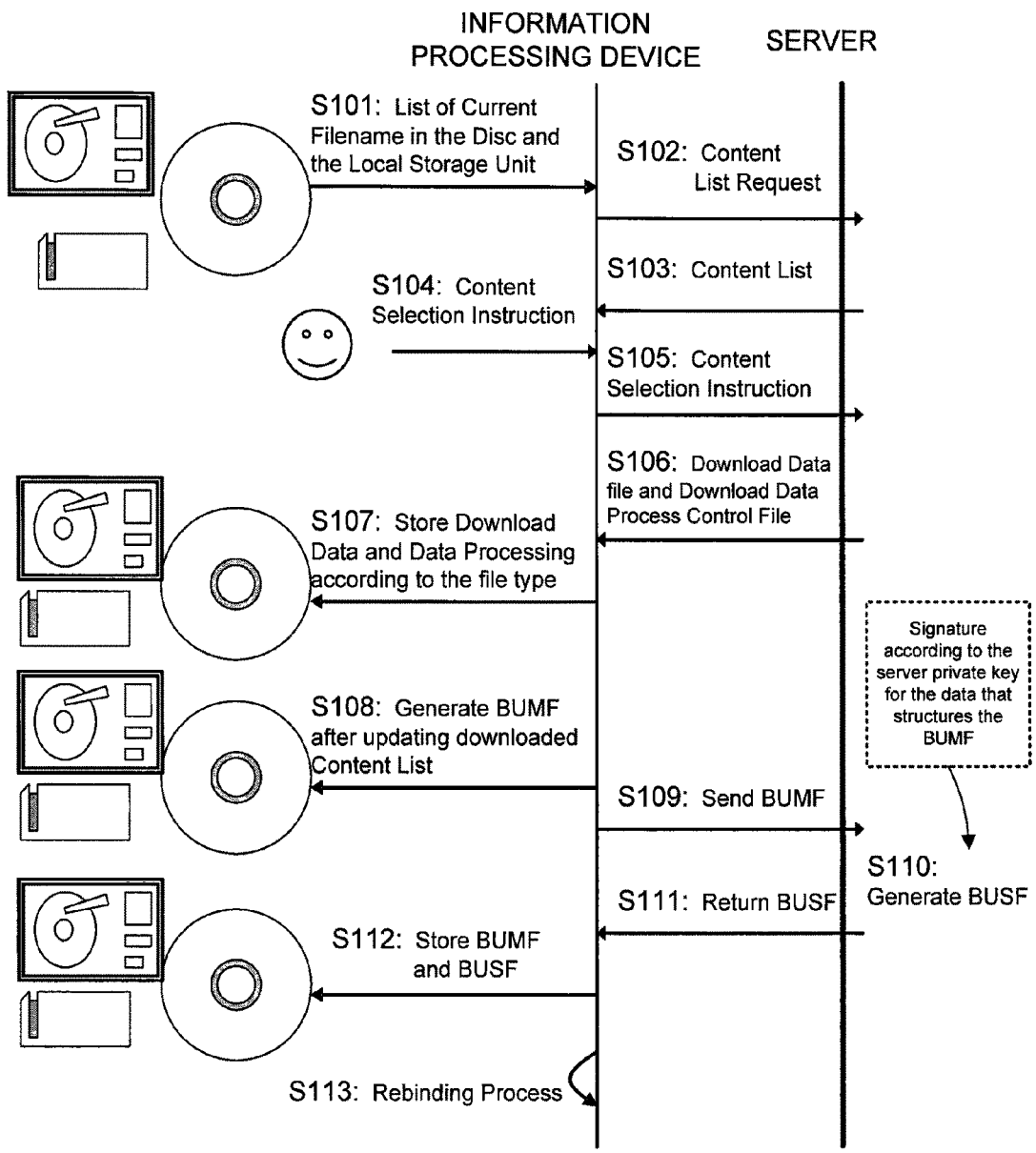
FIG. 11 is a sequence diagram for explaining a sequence for a process for obtaining subsequential data from a server, executed in an information processing system according to one example of embodiment as set forth in the present invention.

The explanation will continue, returning to the sequence diagram of FIG. 11. In Step S103, the server references the information regarding the content that is possessed, received from the user information processing device, generates a list of content (for example, the list illustrated in FIG. 12) corresponding to the content that can be provided to the user, and then sends this list to the user-side information processing device.

Figure 13:
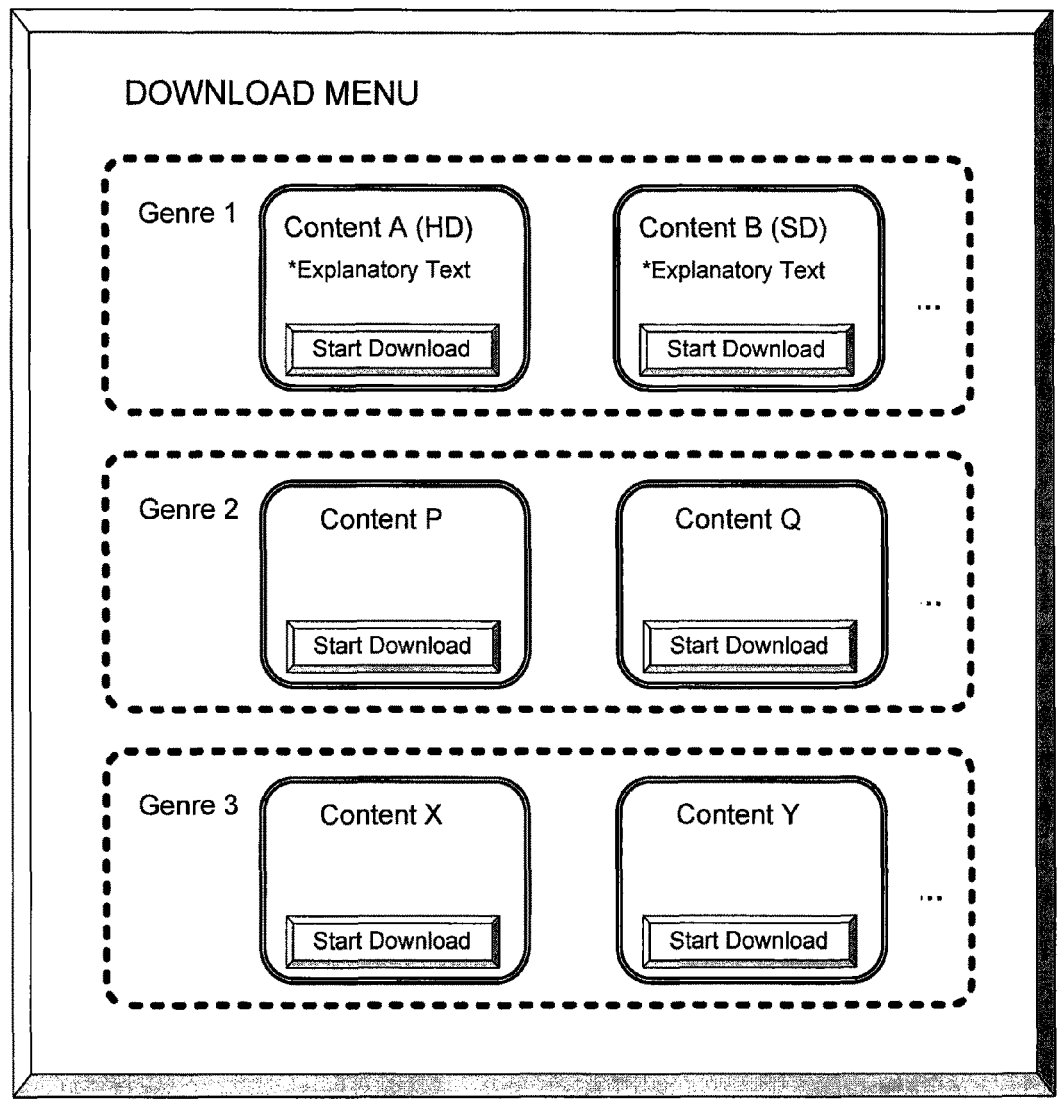
FIG. 13 is a diagram for explaining an example of a data structure for a download menu that is displayed on an information processing device based on the content list that is provided to a server.

When a content list is received from the server, the user-side information processing device generates display data for selecting the content (a download menu) as illustrated in FIG. 13, for example, based on the content list that has been received, and displays this display data on a display unit, and a content selection process is performed by a user.

FIG. 13 is a diagram illustrating an example of the display data (download menu) for selecting content, displayed on the display unit of the user-side information processing device based on the content list illustrated in FIG. 12. The download menu illustrated in FIG. 13 is structured with the content categorized by genre. Furthermore, this is a download menu wherein the content to be downloaded can be selected by the type of media to which the download will be made (that is, by the type of local storage unit: HD or SD).

The user selects the desired subsequential data from the download menu as illustrated in, for example, FIG. 13, and clicks the "Begin download" button for the selected content. A content acquisition request is sent to the server by this process. The content acquisition request is sent to the server as the content selection instruction in Step S105 illustrated in FIG. 11.

In Step S106, the server sends, to the user-side information processing device, data corresponding to the specified content. Specifically, download data that is selected by the download data file ID in the content list explained above in reference to FIG. 12 (the subsequential data itself, such as subtitles: for example, the AVStream, Clipinfo, or PlayList files, or the like) and the download data processing information file (a file describing the state of processing of the subsequential data selected by the download data processing information file ID) are sent to the user-side information processing device.

The download data selected via the download data file ID is structured in accordance with the data format explained already in reference to FIG. 3, structured from a plurality of data files such as an index, a movie object, a play list, a clip, and the like. The download data processing information file is a file that lists, for example, the file types of each of the files that structure these subsequential data.

FIG. 4 illustrates an example of the data structure of the download data processing information file. As is shown in FIG. 14, the download data processing information file is provided with download data file IDs that indicate the file IDs of the download data files to be received from the server, and corresponding data file type information that indicates whether each individual file is a clip information (ClipInfo) file, a clip AV stream (ClipAVStream) file, or a play list (PlayList) file.

In this way, the server receives a data acquisition request from the user-side information processing device via the communication unit, and the data processing unit of the user, in response to the data acquisition request, generates a data file and a processing information file that stores file type information of the data file, and sends these files through the communication unit to the user device.

In Step S107 of the sequence diagram illustrated in FIG. 11, the data processing unit of the user-side information processing device determines, in accordance with the records in the download data processing information file, the type of each file that structures the subsequential data that is sent from the server, and records the data by placing each individual file in the specified area of the predetermined directories of the local storage unit 102.

The user-side information processing device stores the files of the subsequential data itself, for example, the AVStream, the ClipInfo, the PlayList, and so forth, and then performs the process of generating or updating the download file local control information and the control data such as the downloaded content list.

The data recording processes of Step S107 that are performed by the user-side information processing device include: (1) Creating a directory having, as the directory name, a unique number that has not yet been used in the local storage unit (such as "AAAAAAA") and storing the data therein. (2) Assigning, as the filename in the VFS for a new clip, a clip number that has not been used in the current virtual file system (VFS (virtual package)). (3) Assigning, as the filename in the VFS for a new play list, a play list number that has not been used in the current virtual file system (VFS (virtual package)), and overwriting, with the clip number specifying information within the play list, the clip number that has been assigned to the clip. (4) Adding, to the information for each file in the download file local control information, the filename in the local storage unit and the filename in the virtual file system (VFS (virtual package)) and storing as the download data local control information (AAAAAAAA.meta). (5) Adding, to the downloaded content list, the name of the directory that has been created.

Note that although, in the file system in the aforementioned local storage unit, the filename of each file can be set freely, it is assumed that in each of the file types of the individual files, such as the clip information (ClipInfo) file, the clip AV stream (ClipAVStream) file, the play list (PlayList) file, etc., there will be specific operating rules to determine the filename, and a filename that has not yet been used will be searched, in accordance with those rules, and then used. Note that the filename that is set in the virtual file system (VFS) that is structured at the time of the content reading process will be determined referencing the filename conversion name table (BUMF) that was explained in reference to FIG. 6.

Figure 15:
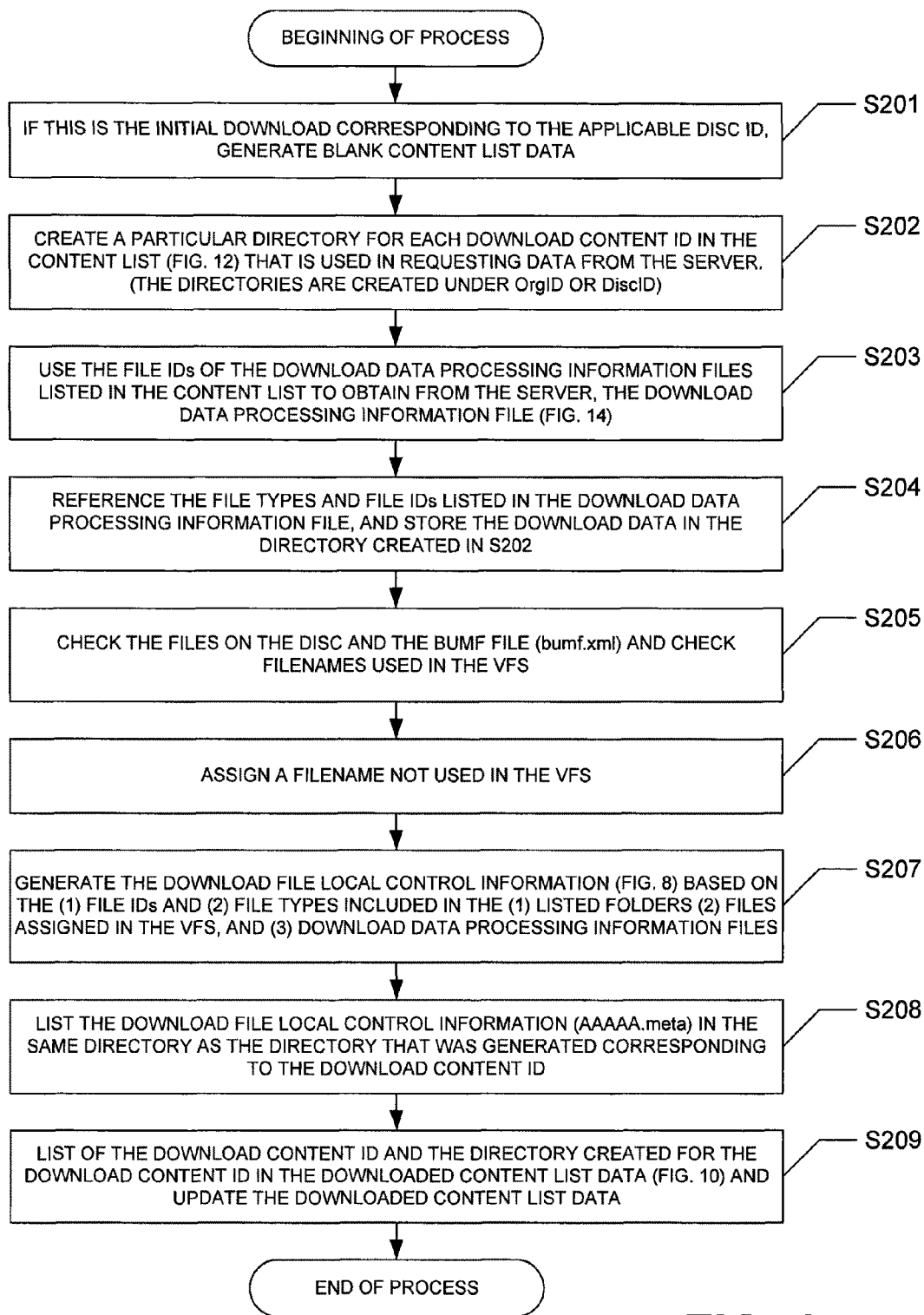
FIG. 15 is a diagram illustrating a flowchart for explaining a sequence of processes that is performed by an information processing device at the time of a process for obtaining subsequential data and storing the subsequential data to the local storage unit.

The detailed processing sequence performed by the information processing device 100 at the time of a process of acquiring the subsequential data and storing the subsequential data to the local storage unit 102, in Step S104 through S107 in the sequence diagram illustrated in FIG. 11, will be described next in reference to the flowchart illustrated in FIG. 15. The flow illustrated in FIG. 15 is performed by the data processing unit 101 of the information processing device 100 illustrated in FIG. 1. The data processing unit 101 reads out a program (for example, the BD-J application) that has already been stored on, for example, the information recording medium 200, to perform processing following the flow illustrated in FIG. 15.

The processes in each step will be described in detail. In Step S201, if the download is the first download corresponding to the package ID (=disc ID) of the information recording medium (disc) that is applied to performing the download, then blank downloaded content list data is generated, but downloaded content list data already exists, then that list data is obtained. The downloaded content list data has a data structure that defines the correspondence between the download content ID and the storage directory, as already explained above in reference to FIG. 10.

Next, in Step S202, a unique directory is created for each download content ID in the content list (shown in FIG. 12) used when requesting data from the server. As is shown in FIG. 7, the directories are created in OrgID or in DiscID.

Next, in Step S203, the file ID of the download data processing information file listed in the content list is used to obtain the download data processing information file (shown in FIG. 14) from the server.

Next, in Step S204, the file IDs and file types listed in the download data processing information file are referenced to store the download data in the directories created in Step S202.

Next, in Step S205, the files on the disc and the filename conversion table (BUMF (bumf.xml)) (shown in FIG. 6) are checked to check for VFS filenames that have already been used.

Next, in Step S206, unused filenames, not listed in the filename conversion table (BUMF (bumf.xml)), are allocated as the VFS filenames corresponding to each of the files (the clip information (ClipInfo) file, the clip AV stream (ClipAVStream) file, the play list (PlayList) file, etc.) that structure the subsequential data that is received.

Next, in the Step S207, three types of information are referenced to generate or update the download file local control information (shown in FIG. 8):

(1) Files stored in the local storage unit;
(2) The VFS filenames assigned to each file; and
(3) The (a) file IDs and (b) file types included in the download data processing information file.

Next, in Step S208, the download file local control information (AAAAA.meta) (shown in FIG. 8) is stored into the same directories as the directories that were created corresponding to the download contents IDs.

Finally, in Step S209, the download content IDs and the directories created for the download contents IDs are recorded in the downloaded content list data (shown in FIG. 10), to thereby update the downloaded content list data.

This processing according to the flow of FIG. 15 is performed by the information processing device 100 at the time of the process for acquiring the subsequential data and storing the subsequential data to the local storage unit 102 in Step S104 through S107 in the sequence diagram illustrated in FIG. 11.

When the process, in Step S107 in the sequence diagram illustrated in FIG. 11, for storing the subsequential data to the local storage unit 102 has been completed, then, in Step S108, the user-side information processing device performs a process for generating or updating the filename conversion table (manifest file (BUMF)) that includes the filename conversion information for the subsequential data that has been obtained.

The filename conversion table (manifest file (BUMF)), as already explained in reference to FIG. 6, is a table for converting the filename in the local storage unit to a filename in the VFS, and has a structure that defines the relationship between the filename in the local storage unit, the studio ID, the package ID, and the post-conversion filename.

An example of a process for generating a filename conversion table (manifest file (BUMF) that includes the information for the newly obtained subsequential data will be explained in reference to FIG. 16.

FIG. 16(*a*) is the filename conversion table (manifest file (BUMF)) prior to updating, and (b) is the filename conversion table (manifest file (BUMF)) after updating. The data portion 451 of the filename conversion table (manifest file (BUMF)) of FIG. 16(*b*) is the portion wherein file conversion information for the subsequential data that has been newly obtained from the server has been added. This type of filename conversion table (manifest file (BUMF)) that includes changed information for the files for the newly obtained subsequential data is generated in the information processing device.

When a filename conversion table (manifest file (BUMF) that includes information for a newly obtained subsequential data has been generated in Step S108 of the sequence diagram illustrated in FIG. 11, then, in Step S109, the BUMF that has been generated is sent to the server. In Step S110, the server generates signature data through the application of its own private key to the data that structures the filename conversion table (manifest file (BUMF)) received from the user-side information processing device, and generates file tampering validation data (BUSF) that includes the signature data. Next, in Step S111, the file tampering validation data (BUSF) that has been generated is sent to the user-side information processing device.

The user-side information processing device, in Step S112, stores the file tampering validation data (BUSF), received from the server, in the local storage unit together with the filename conversion table (manifest file (BUMF)) that has been generated or updated.

Finally, in Step S113, the information processing device structures the virtual file system (VFS) from the most recent filename conversion table (manifest file (BUMF)) and file tampering validation data (BUSF), and then advances to reading the content. Note that the processes in Step S113 are omitted when the content reading process is not performed. The processes in Step S113 are performed when reading the content (the subsequential data).

The details of the processes in Step S108 through S113 in the sequence illustrated in FIG. 11, namely, the processes for generating or updating the filename conversion table (manifest file (BUMF)) and file tampering validation data (BUSF) will be explained in detail in a later stage referencing FIG. 19 and beyond.

The sequence illustrated in FIG. 11 is the sequence of processes for obtaining subsequential data from the server, and the processes for generating or updating the filename conversion table (manifest file (BUMF)) and the file tampering validation data (BUSF) are required not only at the time of these processes for obtaining new subsequential data, but also when performing processes such as the following:

(1) When subsequential data that has already been obtained is deleted from the user-side information processing device; and (2) When subsequential data that has already been obtained in relation to a disc A is detected as being data that can also be used as subsequential data in relation to a different disc B.

It is necessary to perform the processes for updating the filename conversion table (manifest file (BUMF)) and the file tampering validation data (BUSF) in these cases as well.

The processing sequences that are executed between the user-side information processing device and the server in the aforementioned cases (1) and (2) will be explained in reference to the sequence diagrams in FIG. 17 and FIG. 18.

Figure 17:
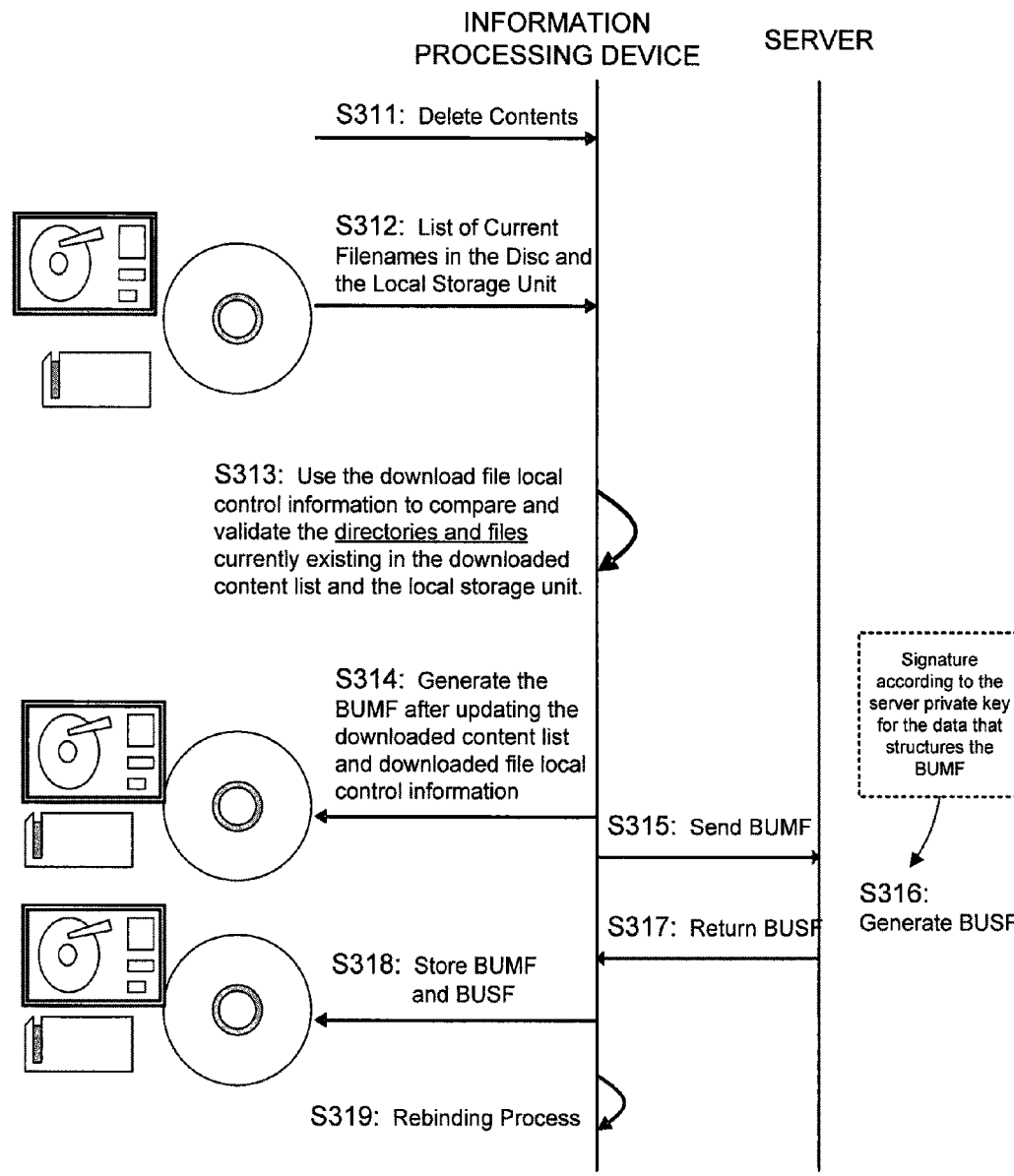
FIG. 17 is a diagram for explaining an example of a process for updating a filename conversion table (manifest file (BUMF) when content is deleted, executed in an information processing device according to one example of embodiment as set forth in the present invention.

(1) First, in the case of deleting, from the user-side information processing device, subsequential data that has already been obtained, the sequence diagram illustrated in FIG. 17 will be used to explain the processing sequences that are performed between the user-side information processing device and the server when deleting, from the user-side information processing device, subsequential data that has already been obtained.

First, in Step S311, the user deletes at least a portion of the subsequential data that has already been stored in the local storage unit 102 of the information processing device 100. Next, in Step S312, the information processing device 100 on the user side generates or obtains list information (a filename list) for the content, doing so through a search of the information recording medium (disc) 200 and the local storage unit 102.

Next, in Step S313, the download file local control information (shown in FIG. 8), and the like is used to compare and validate the downloaded content list with the list of directories and files that exist on the local storage unit. That is, checks are made for discrepancies between the various control files and the data that is actually stored.

Next, in Step S314, the downloaded content list (shown in FIG. 10) and the download file local control information (shown in FIG. 8) is updated based on the results of the checks in Step S313. That is, the subsequential data that has been deleted is deleted from the data that is stored in the various control data. Following this, after these control data have been updated, the BUMF is updated by deleting the filename conversion data for the data that has been deleted from the filename conversion table (manifest file (BUMF)).

The filename conversion table (manifest file (BUMF)), as already explained in reference to FIG. 6, is a table for converting the filename in the local storage unit to a filename in the VFS, and has a structure that defines the relationship between the filename in the local storage unit, the studio ID, the package ID, and the post-conversion filename. The entries corresponding to the data that has been deleted are deleted from the filename conversion table (manifest file (BUMF)).

If the filename conversion table (manifest file (BUMF)) is updated in Step S314, then, in Step S315, the updated BUMF is sent to the server. In Step S316, the server generates signature data through the application of its own private key to the data that structures the filename conversion table (manifest file (BUMF)) received from the user-side information processing device, and generates file tampering validation data (BUSF) that includes the signature data. Next, in Step S317, the file tampering validation data (BUSF) that has been generated is sent to the user-side information processing device.

The user-side information processing device, in Step S318, stores the file tampering validation data (BUSF), received from the server, in the local storage unit together with the filename conversion table (manifest file (BUMF)) that has been generated or updated.

Finally, in Step S319, the information processing device structures the virtual file system (VFS) from the most recent filename conversion table (manifest file (BUMF)) and file tampering validation data (BUSF), and then advances to reading the content. Note that the processes in Step S319 are omitted when the content reading process is not performed. The processes in Step S319 are performed when reading the content (the subsequential data).

In this way, when subsequential data is deleted, the updating of the filename conversion table (manifest file (BUMF)) is performed by the user-side information processing device itself. The processing is complete when the information processing device sends the updated filename conversion table (manifest file (BUMF)) to the server, receives the file tampering validation data (BUSF) from the server, and these files have been stored.

The processing sequence that is performed between the user-side information processing device and the server when it has been detected that subsequential data that has already been obtained in relation to a disc A is data that can be used as subsequential data for a different disc B will be explained next in reference to the sequence diagram illustrated in FIG. 18.

In this case, the information processing device that has loaded the disc B will perform a process of adding, as subsequential data for the disc B, the subsequential data that has already been obtained as subsequential data for the disc A.

First, of the subsequential data that has already been stored by the user in the local storage unit 102 of the information processing device 100, data that is subsequential data that has already been obtained in relation to a particular disc A is detected as data that can be used also as subsequential data for a different disc B. In Step S321, a process is initiated for adding this subsequential data as subsequential data for the disc B.

Next, in Step S322, the information processing device 100 on the user side generates or obtains list information (a filename list) for the content, doing so through a search of the information recording medium (disc) 200 and the local storage unit 102.

Next, in Step S323, the download file local control information (shown in FIG. 8), and the like is used to compare and validate the downloaded content list with the list of directories and files that exist on the local storage unit. That is, checks are made for discrepancies between the various control files and the data that is actually stored.

Next, in Step S324, the downloaded content list (shown in FIG. 10) and the download file local control information (shown in FIG. 8) is updated based on the results of the checks in Step S323. That is, the subsequential data, after updating the situation wherein it is used, is stored in each control data together with the situation of use.

Following this, after these control data have been updated, the BUMF is updated by updating the filename conversion data to match the situation of use of the subsequential data, for the filename conversion table (manifest file (BUMF)).

The filename conversion table (manifest file (BUMF)), as already explained in reference to FIG. 6, is a table for converting the filename in the local storage unit to a filename in the VFS, and has a structure that defines the relationship between the filename in the local storage unit, the studio ID, the package ID, and the post-conversion filename. The filename conversion table (manifest file (BUMF)) is modified by modifying the entries to match the situation of use of the subsequential data.

If the filename conversion table (manifest file (BUMF)) is updated in Step S324, then, in Step S325, the updated BUMF is sent to the server. In Step S326, the server generates signature data through the application of its own private key to the data that structures the filename conversion table (manifest file (BUMF)) received from the user-side information processing device, and generates file tampering validation data (BUSF) that includes the signature data. Next, in Step S327, the file tampering validation data (BUSF) that has been generated is sent to the user-side information processing device.

The user-side information processing device, in Step S328, stores the file tampering validation data (BUSF), received from the server, in the local storage unit together with the filename conversion table (manifest file (BUMF)) that has been generated or updated.

Finally, in Step S329, the information processing device structures the virtual file system (VFS) from the most recent filename conversion table (manifest file (BUMF)) and file tampering validation data (BUSF), and then advances to reading the content. Note that the processes in Step S329 are omitted when the content reading process is not performed. The processes in Step S329 are performed when reading the content (the subsequential data).

In this way, when the situation wherein subsequential data is used is changed, the updating of the filename conversion table (manifest file (BUMF)) is performed by the user-side information processing device itself. The processing is complete when the information processing device sends the updated filename conversion table (manifest file (BUMF)) to the server, receives the file tampering validation data (BUSF) from the server, and these files have been stored.

Figure 18:
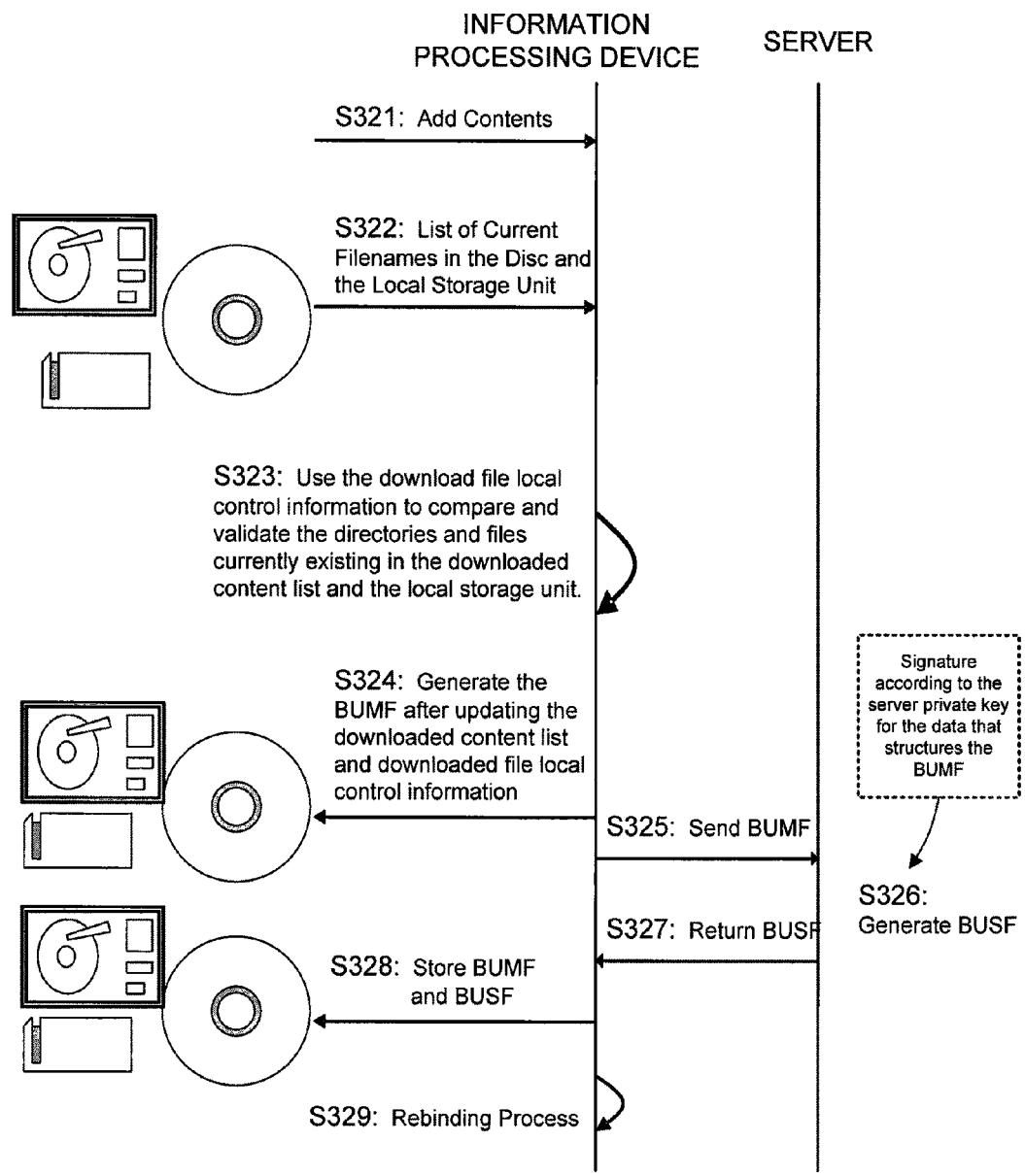
FIG. 18 is a diagram for explaining an example of a process for updating a filename conversion table (manifest file (BUMF) when the use situation has changed, executed in an information processing device according to one example of embodiment as set forth in the present invention.

The sequence diagrams of FIG. 11, FIG. 17, and FIG. 18 have been used, respectively, to explain the processing sequences between the information processing device and the server for:

(1) The case wherein subsequential data is newly obtained (FIG. 11);

(2) The case wherein subsequential data that has already been obtained is deleted (FIG. 17); and (3) The case wherein the situation of use of subsequential data that has already obtained has been changed (FIG. 18).

A process for generating or updating the filename conversion table (manifest file (BUMF)) is required in all of these cases. Furthermore, a process is also required for obtaining, from the server, the file tampering validation data (BUSF) corresponding to the generated or updated filename conversion table (manifest file (BUMF)).

(0177) The process for generating or updating the filename conversion table (manifest file (BUMF)), and the process for obtaining the file tampering validation data (BUSF) will be described below in reference to FIG. 19 and FIG. 20.

Figure 19:
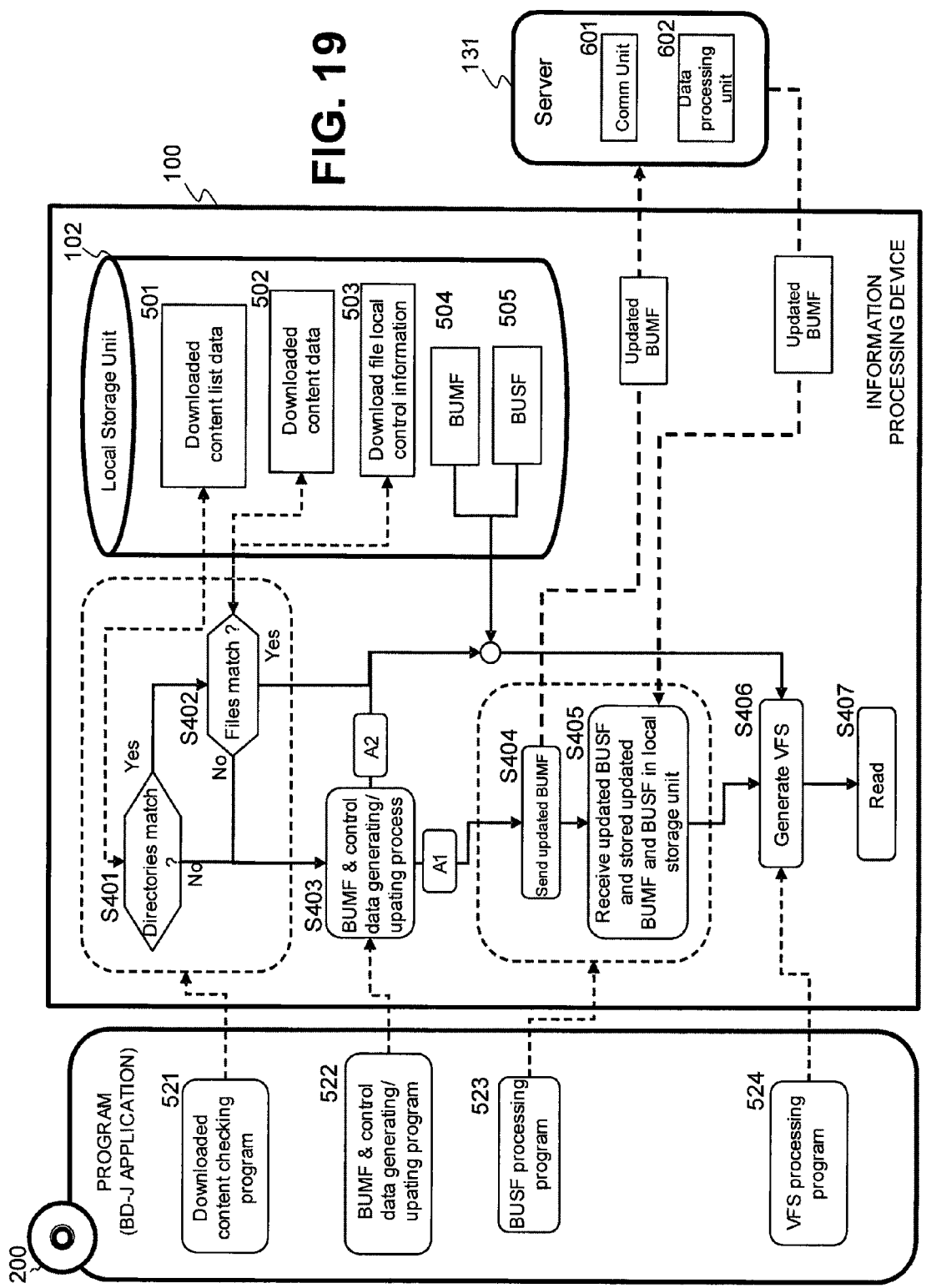
FIG. 19 is a diagram for explaining the detail of a process for generating or updating a filename conversion table (manifest file (BUMF)), and the process for obtaining file tampering validation data (BUSF).
Figure 20:
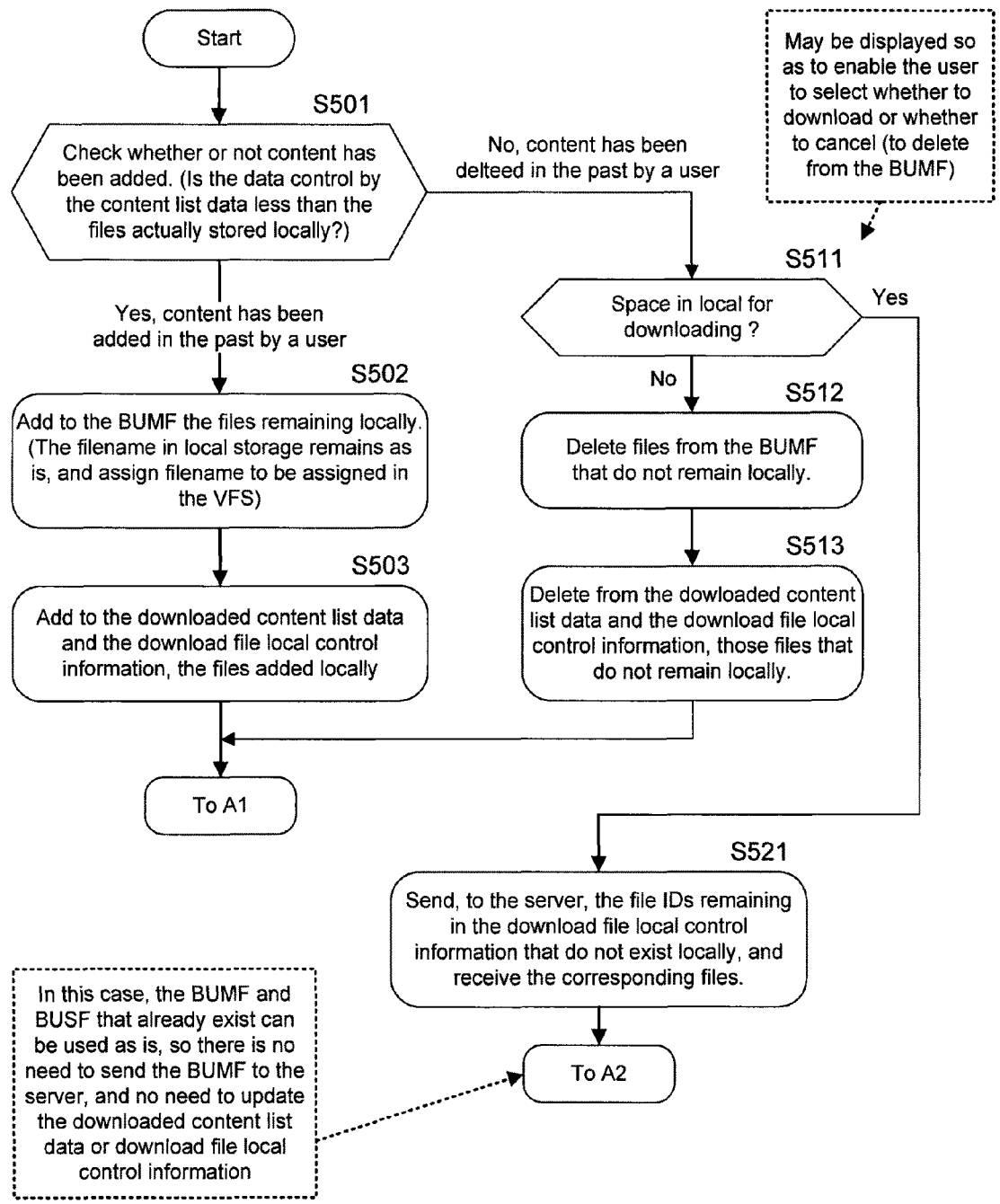
FIG. 20 is a diagram illustrating a flowchart for explaining a sequence for a process for generating or updating a filename conversion table (manifest file (BUMF)) or control data, executed in an information processing device.

FIG. 19 shows the user-side information processing device 100 and the server 131. A local storage unit 102, structured from a hard disk, or the like, is shown within the information processing device 100. The server 131 performs the process for providing the subsequential data, and performs a process for receiving a filename conversion table (manifest file (BUMF)) that has been generated or updated in the information processing device 100, generating the file tampering validation data (BUSF), and sending the file tampering validation data (BUSF) to the information processing device 100. The server 131 has a communication unit 601 and a data processing unit 602. FIG. 19 further shows the information recording medium (disc) 200 equipped in the user-side information processing device 100.

Downloaded content data 502 is stored in the local storage unit 102 as subsequential data, and, as has already been explained, data for downloaded content list data 501 (shown in FIG. 10), download file local control information 503 (shown in FIG. 8), a filename conversion table (manifest file (BUMF)) 504 (shown in FIG. 6), and file tampering validation data (BUSF) 505 are stored as control data.

The processes in Step S401 through S407, illustrated in FIG. 19, are processes that are performed by the data processing unit 101 (shown in FIG. 1) of the information processing device 100. The data processing unit 101 of the information processing device 100 performs each of the processes in Step S401 through S407 by executing a program (such as a BD-J application, which is a Java™ application) that is recorded on the information recording medium (disc) 200. The processes of this program perform the processes for updating the filename conversion table (manifest file (BUMF)) and the processes for obtaining file tampering validation data (BUSF).

(a) A downloaded content checking program 521, (b) a BUMF and control data generating/updating program 522, (c) a file tampering validation data (BUSF) processing program 523, and (d) a virtual file system (VFS) generating program 524 are recorded on the information recording medium (disc) 200. Note that while, for explanatory purposes, the programs are illustrated in the figure as being separate, the structure may be one wherein these programs are individual programs that execute processes individually, or the structure may be one wherein a single program that performs the series of processes is provided.

The processing steps S401 through S407, performed by the information processing device 101 of the information processing device 100 will be explained. Note first that the processes in steps S401 through S402 are performed using the (a) downloaded content checking program 521.

In Step S401, the downloaded content list data 501 (shown in FIG. 10) that is stored in the local storage unit 104 is obtained, and a comparison is performed between the directories provided in the local storage unit 102 and the directories listed as existing directories in the data listed in the downloaded content list data 501.

Processing advances to Step S403 if a discrepancy is detected between the directories that exist in the local storage unit 102 and the directories that are listed in the directories that exist in the data that is listed in the downloaded content list data 501. If no discrepancy is detected, then processing advances to Step S402.

In Step S402, a process is performed for comparing the files listed in the downloaded file local control information 503 (shown in FIG. 8), stored in the local storage unit 104, to the downloaded content data 502 that is actually stored in the local storage unit 102.

Processing advances to Step S403 if a discrepancy is detected between the files listed in the downloaded file local control information 503 (shown in FIG. 8) and the downloaded content data 502. If no discrepancy is detected, then processing advances to Step S406.

Step S403 is the process in the case wherein a directory discrepancy has been detected in Step S401 or a file discrepancy has been detected in Step S402, and is a step wherein the processes for generating or updating the filename conversion table (manifest file (BUMF)) and the processes for generating or updating the other control data that is recorded in the local storage unit are performed. This Step S403 is performed using the (b) BUMF & control data generating/updating program 522. Note that the control data includes the downloaded content list data 501 (shown in FIG. 10) and the download file local control information 503 (shown in FIG. 8) that are stored in the local storage unit 102.

The detailed sequence for the processes in Step S403 will be explained in reference to the flowchart illustrated in FIG. 20. A determination is made in Step S501 as to whether or not content has been added. That is, a comparison is made with the files that are actually stored in the local storage unit 102, and a determination is made as to whether or not there are fewer files listed in the downloaded content list data (shown in FIG. 10), which is control data.

If the determination is "Yes," then processing advances to Step S511, indicating that a process for deleting content has been performed in the past by a user, or the like, without the content list control data or download file local control information being controlled. If the determination is "No," then processing advances to Step S502, indicating that a process for adding content has been performed in the past by a user, or the like, without the content list control data or download file local control information being controlled. Note that the processing in Step S501 is performed only when the determination in Step S401 or Step S402 in FIG. 19 is "No." Consequently, it is performed only when a discrepancy has arisen between the data stored in the local storage unit and the control data, so is performed when either an addition or a deletion has been performed.

If a process for adding content has been performed, then, in Step S502, the file that is stored in the local storage unit wondered to that is not listed is added to the filename conversion table (manifest file (BUMF)). The filename in the local storage unit wondered to is left as is, and a filename to be allocated in the virtual file system (VFS) is established and listed.

Next, in Step S503, a process is performed to update the downloaded content list data (shown in FIG. 10) and the download file local control information (shown in FIG. 8). That is, the process is performed to add an entry corresponding to the file that is stored in the local storage unit but that has not yet been listed in the various control data.

On the other hand, if the determination in Step S501 is "Yes," then processing advances to Step S511, indicating that a process for deleting content has been performed. In Step S511, first a process is attempted wherein the information listed in the various control data takes priority. That is, a check is made as to whether or not the local storage unit has adequate free space to re-download the file that is listed in the control data but not stored in the local storage unit 102.

If it is determined that there is adequate free space, then processing advances to Step S521, and the file ID of the file that is listed in the control data such as the download file local control information, but that does not exist in the local storage unit, is sent to the server, and the corresponding file is received and stored in the local storage unit 1 [sic—"102"?]. This process is a process that is performed as a process for reconciling, to the control data, the data that is stored in the local storage unit. When this process has been performed, then it is not necessary to change the various control data that has been stored in the local storage unit, the filename conversion table (manifest file (BUMF)), or the file tampering validation data (BUSF).

On the other hand, if, in Step S511, it is determined that there is not adequate space in the local storage unit for the file to be re-downloaded, then processing advances to Step S512, and a process is performed for reconciling the control data and the data listed in the filename conversion table (manifest file (BUMF)) to the actual data that is stored in the local storage unit 102.

First, in Step S502, a process is performed to delete, from the filename conversion table (manifest file (BUMF)), the entry corresponding to the file that is not stored in the local storage unit 102.

Next, in Step S513, a process is performed to update the downloaded content list data (shown in FIG. 10) and the download file local control information (shown in FIG. 8). That is, the process is performed to delete the entry corresponding to the file that is listed in the various control data but is not stored in the local storage unit.

Note that at the time of the determination process in Step S511, a message may be displayed to enable the user to select whether to download or to perform the updating of the control files in Step S512 and S513 without downloading. That is, the structure may be one wherein either the processes in Step S521 or the processes in Step S513 and S514 may be performed depending on the user instruction.

In the processes in Step S501 through S503, listing entries are added to the filename conversion table (manifest file (BUMF)) and the control data, and in the processes in Step S501 through 511 through S513, listed entries are deleted from the filename conversion table (manifest file (BUMF)) and the control data.

When the filename conversion table (manifest file (BUMF)) has been updated in this way, it is necessary perform a process for sending the updated filename conversion table (manifest file (BUMF)) to the server and for obtaining the file tampering validation data (BUSF). This process is the process of Step S404 through S405 illustrated in FIG. 19.

The processes in Step S404 and S405 are performed according to the file tampering validation data (BUSF) processing program 523.

First, in Step S404, the updated filename conversion table (manifest file (BUMF)) is sent to the server 131. The server 131 receives the updated filename conversion table (manifest file (BUMF)) through the communication unit 601, and in the data processing unit 602, the private key owned by the server is applied to generate an electronic signature for the data that structures the filename conversion table (manifest file (BUMF)).

The server sends the file tampering validation data (BUSF), as data that includes the electronic signature, to the information processing device 100 through the communication unit 601. The information processing device 100 receives the updated BUSF, which contains the signature data for the updated BUMF, and stores the updated BUMF and the updated BUSF in the local storage unit 102. At this point, the process for updating the data stored in the local storage unit is completed.

The processes in Step S406 through S407 are processes for reading content, processes that are performed when structuring the virtual file system (VFS) to read content that includes the subsequential data.

Step S406 is the process for constructing the virtual file system (VFS), and is performed using the VFS generating program 524. This process is the process that was explained already in reference to FIG. 5. That is, this is a process for establishing the virtual file system (VFS) for reading, in conjunction with the content that is stored on the information recording medium (disc) 200, the subsequential data that is stored in the local storage unit 102, such as a hard disk.

Next, in Step S407, content reading is performed through the application of the virtual file system (VFS). If, for example, the content that is stored in the information recording medium (disc) 200 is movie content in French, and the subsequential data that is stored in the local storage unit 102, such as a hard disk, is Japanese-language subtitle data corresponding to the movie content, it is possible to play the movie with Japanese-language subtitling by reading both together.

The present invention has been explained in detail above in reference to specific examples of embodiment. However, obviously persons skilled in the art can modify and perform substitutions in the examples of embodiment in a range that does not deviate from the scope or intention of the present invention. That is, the present invention is disclosed in a form of examples, and these must not be interpreted to be limiting. The scope of patent claims should be considered in order to determine the scope and intent of the present invention.

Additionally, the series of processes described in the specification may be performed in hardware, in software, or in a structure that combines both. When a process is performed in software, a program wherein the processing sequence is recorded may be executed through installation into a memory within a computer that is built into specialized hardware, or may be performed through installation of a program into a general-use computer that can perform the various processes. For example, the program may be stored in advance in a recording medium. The program may be installed from the recording medium into a computer, or may be sent via a LAN (Local Area Network) or the network known as the Internet, to be installed into a built-in recording medium such as a hard drive.

Note that not only may the various processes described in the specification be performed in the time sequence according to the description, but may also be performed in parallel or individually, depending on the necessity or on the processing capability of the device that performs a processes. Furthermore, in the present specification, "the system" is a logical collective structure of a plurality of devices, and is not limited to each structural device being within the same frame.

POTENTIAL FOR USE IN INDUSTRY

As described above, the present invention is applied to a structure that stores subsequential data, corresponding to content that is stored in an information recording medium, such as a DVD, into a local storage unit, such as a hard disk, or the like, for use. When constructing a virtual file system (VFS) to be used in a content reading process that includes data that is stored on a disc and data that is stored in a storage unit, it is necessary to use a filename conversion table to convert the storage unit storage filename to a VFS filename for the virtual file system (VFS). In a structure in one example of embodiment as set forth in the present invention, a process is performed to compare, for data that is stored in a local storage unit, the stored information of a control file that stores control information, compared to the stored data of the local storage unit, and a process is performed to generate or update the filename conversion table, on the user device side, in accordance with the results of the comparison. This structure achieves an efficient process without having to rely on the server side for the generation of the filename conversion table.

The invention claimed is:

1. An information processing device comprising:
 a storage unit for storing a data file including readable content, and a control file including control information corresponding to the data file; and
 a data processing unit configured to use a filename conversion table, which stores filename conversion information, to:
  (1) convert the filename of a file stored in the storage unit into a name on a virtual file system (VFS);
  (2) construct the VFS that includes storage data of a disc and the data file of the storage unit; and
  (3) perform a data reading process;
 wherein the data processing unit:
  (1) compares the control information included in the control file and the data file stored in the storage unit;
  (2) updates the filename conversion table to reconcile the control information included in the control file and the data file stored in the storage unit; and
  (3) determines whether or not there is a discrepancy listing fewer files in the control information included in the control file than the data file stored in the storage unit,
 wherein the data processing unit further configured to confirm the validity of the filename conversion table through signature validation of a file tampering validation data before converting the filename of the file stored in the storage unit into the name on the VFS.

2. An information processing device as set forth in claim 1, wherein the data processing unit:
 (1) sends the filename conversion table to a server,
 (2) receives signature data of the server generated in relation to the filename conversion table, and
 (3) stores the signature data in the storage unit,
 when the data processing unit has read and/or updated the filename conversion table.

3. An information processing device as set forth in claim 1, wherein:
 the storage unit is configured to store content table data downloaded from a server as the control file; and
 the data processing unit configured to compare the downloaded content table data and the stored data in the storage unit, and to generate and/or update the filename conversion table when the discrepancy is detected.

4. An information processing device as set forth in claim 3, wherein:
 the downloaded content table data includes directory information of the storage unit that stores data acquired from the server; and
 the data processing unit is configured to:
 (1) compare a storage directory and a setting directory of the storage unit; and
 (2) generates and/or updates the filename conversion table when the discrepancy is detected.

5. An information processing device as set forth in claim 1, wherein:

the storage unit is configured to store download file local control information which includes a storage filename of data stored in the storage unit as the control file; and the data processing unit is configured to compare a storage file of the download file local control information and a storage file of the storage unit, and to generate and/or update the filename conversion table when the discrepancy is detected.

6. An information processing device as set forth in claim 5, wherein the data processing unit also configured to generate and/or update the download file local control information when the data processing unit has generated and/or updated the filename conversion table.

7. An information processing device as set forth in claim 1, wherein the data processing unit is configured to receive from a server a download processing information file, to identify a type of a file to be obtained from the server, and to store in the storage unit in accordance with the type of the file.

8. An information processing device as set forth in claim 1, wherein the data processing unit generates and/or updates the filename conversion table, when the data processing unit has performed an adding process or deleting process, or a use status changing process, with respect to the stored data of the storage unit.

9. An information processing device as set forth in claim 1, wherein the data processing unit generates and or updates the filename conversion table through the execution of a program stored on the disc.

10. A server device comprising:

a communication unit configured to receive, from a user device, a filename conversion table, wherein the filename conversion table stores filename conversion information for:
(1) converting a filename of a file that is stored in a storage unit of the user device into a name on a virtual file system (VFS);
(2) constructing the VFS that includes storage data of a disc and storage data of the storage unit; and
(3) performing a data reading process;

wherein the filename conversion information is used to reconcile data stored in a control file and data stored in the storage unit of the user device by determining whether or not there is a discrepancy showing fewer files in the data included in the control file than the data stored in the storage unit of the user device; and a data processing unit configured to generate signature data applied as a server private key with respect to the filename conversion table, wherein the signature data generated by the data processing unit is sent to the user device by the communication unit, and wherein the data processing unit further configured to confirm the validity of the filename conversion table through signature validation of a file tampering validation data before converting the filename of the file stored in the storage unit into the name on the VFS.

11. A non-transitory information recording medium comprising:

a data file including readable content; and a program for performing a generating process and/or an updating process for a filename conversion table, wherein the filename conversion table stores filename conversion information for:

(1) converting a filename of a file stored in a storage unit of a reading device into a name on a virtual file system (VFS);
(2) constructing the VFS that includes storage data of a disc and storage data of the storage unit; and
(3) performing a data reading process;

wherein the filename conversion information is used to reconcile data stored in a control file and data stored in the storage unit of the user device by determining whether or not there is a discrepancy showing fewer files in the data included in the control file than the data stored in the storage unit of the user device, wherein the reading device for reading the information recording medium generates and/or updates a filename conversion table in accordance with the program, and wherein the validity of the filename conversion table is confirmed through signature validation of a file tampering validation data before converting the filename of the file stored in the storage unit into the name on the VFS.

12. An information recording medium as set forth in claim 11, wherein the program includes the program for comparing control data and the file stored in the storage unit of the reading device.

13. An information recording medium as set forth in claim 11, wherein the program includes the program for acquiring, from a server, signature data related to the filename conversion table.

14. An information processing system comprising a server for performing a data providing process and an information processing device for performing the reception of data from the server, the information processing device comprising:

a storage unit for storing a data file containing readable content, and a control file containing control information corresponding to the data file; and a data processing unit for using a filename conversion table storing filename conversion information to:
(1) convert the filename of a file stored in the storage unit into a name on a virtual file system (VFS);
(2) construct the VFS that includes storage data of a disc and the data file of the storage unit;
(3) perform a data reading process;

wherein the data processing unit performs processes:
(1) for detecting discrepancies between storage data of the control file and the data file of the storage unit;
(2) for generating and/or updating the filename conversion table to reconcile the storage data of the control file and the data file of the storage unit; and
(3) for determining whether or not there is a discrepancy listing fewer files in the storage data of the control file than the data file of the storage unit; and wherein the server generates signature data and sends the generated signature data to the information processing device, wherein a server private key is applied to data that structures the filename conversion table, wherein the data processing unit further configured to confirm the validity of the filename conversion table through signature validation of a file tampering validation data before converting the filename of the file stored in the storage unit into the name on the VFS.

15. A data processing method that is executed in an information processing device, the method comprising:

comparing a data file stored in a storage unit and storage data of a control file;

generating and/or updating a filename conversion table that is applied for converting filenames of files stored in the storage unit to a name on a virtual file system (VFS), constructing the VFS that includes the storage data of a disc and the data file of the storage unit, and performing a data reading process, when a discrepancy between the storage data of the control file and the data file of the storage unit is detected; and determining whether or not there is a discrepancy listing fewer files in the storage data of the control file than the data file of the storage unit, wherein the filename conversion table is updated to reconcile control information included in the control file and the data file stored in the storage unit, and wherein the validity of the filename conversion table is confirmed through signature validation of a file tampering validation data before converting the filenames of the files stored in the storage unit to the name on the VFS.

16. A non-transitory storage medium storing a program that causes the execution of information processing in an information processing device, comprising:

comparing a data file stored in a storage unit and storage data of a control file;

generating and/or updating a filename conversion table that is applied for converting filenames of files stored in the storage unit to a name on a virtual file system (VFS), constructing the VFS that includes the storage data of a disc and the data file of the storage unit, and performing a data reading process, when a discrepancy between the storage data of the control file and the data file of the storage unit is detected; and determining whether or not there is a discrepancy listing fewer files in the storage data of the control file than the data file of the storage unit, wherein the filename conversion table is updated to reconcile control information included in the control file and the data file stored in the storage unit, and wherein the validity of the filename conversion table is confirmed through signature validation of a file tampering validation data before converting the filenames of the files stored in the storage unit to the name on the VFS.

* * * * *